(12) United States Patent
Cosneau et al.

(10) Patent No.: US 11,549,803 B2
(45) Date of Patent: *Jan. 10, 2023

(54) METHOD AND DEVICE FOR MEASURING DIMENSIONS BY X-RAYS, ON EMPTY GLASS CONTAINERS RUNNING IN A LINE

(71) Applicant: TIAMA, Vourles (FR)

(72) Inventors: Laurent Cosneau, Soucieu-en-Jarrest (FR); Olivier Colle, Oullins (FR)

(73) Assignee: TIAMA, Vourles (FR)

( * ) Notice: Subject to any disclaimer, the term of this patent is extended or adjusted under 35 U.S.C. 154(b) by 338 days.

This patent is subject to a terminal disclaimer.

(21) Appl. No.: 16/758,180

(22) PCT Filed: Oct. 29, 2018

(86) PCT No.: PCT/FR2018/052683
§ 371 (c)(1),
(2) Date: Apr. 22, 2020

(87) PCT Pub. No.: WO2019/081876
PCT Pub. Date: May 2, 2019

(65) Prior Publication Data
US 2020/0333133 A1 Oct. 22, 2020

(30) Foreign Application Priority Data
Oct. 27, 2017 (FR) ..................... 17 60173

(51) Int. Cl.
*G01B 11/08* (2006.01)
*G06T 7/62* (2017.01)
(Continued)

(52) U.S. Cl.
CPC .............. *G01B 11/08* (2013.01); *B07C 5/122* (2013.01); *B07C 5/126* (2013.01); *B07C 5/3408* (2013.01);
(Continued)

(58) Field of Classification Search
CPC ................. G06T 7/0004; G06T 7/0006; G06T 2207/20116; G06T 7/0002; G06T 7/62;
(Continued)

(56) References Cited

U.S. PATENT DOCUMENTS 5,864,600 A 1/1999 Gray et al.
2006/0058974 A1 3/2006 Lasiuk et al.
(Continued)

FOREIGN PATENT DOCUMENTS

DE 197 56 697 7/1999
DE 10 2007 044 530 4/2009
(Continued)

*Primary Examiner* — Geoffrey E Summers
(74) *Attorney, Agent, or Firm* — Clark & Brody LP

(57) ABSTRACT

The invention concerns a method for measuring the dimensions of empty glass containers (2) consisting in:
- selecting at least one region to be inspected of the container,
- transporting the containers,
- positioning, on either side of the region to be inspected, at least one focus of an X-ray generator tube and image sensors,
- acquiring, using image sensors, for each container during its displacement, at least three radiographic images of the inspected region,
- analyzing the at least three radiographic images so as to determine the three-dimensional coordinates of a set of points to deduce at least one inner diameter of the neck and/or one thickness of the body.

39 Claims, 6 Drawing Sheets

(51) Int. Cl.
*G06T 7/00* (2017.01)
*G06T 17/10* (2006.01)
*B07C 5/12* (2006.01)
*B07C 5/34* (2006.01)

(52) U.S. Cl.
CPC .......... *G06T 7/0002* (2013.01); *G06T 7/0004* (2013.01); *G06T 7/62* (2017.01); *G06T 7/97* (2017.01); *G06T 17/10* (2013.01); *G06T 2207/10116* (2013.01)

(58) Field of Classification Search
CPC .......... G06T 7/97; G06T 17/10; B07C 5/122; B07C 5/126; B07C 5/3408; G01B 11/08; G01B 11/10; G01B 11/105; G01B 15/02; G01B 15/025; G01B 15/04; G01B 15/045; G01B 15/08
USPC ........................................................ 382/142
See application file for complete search history.

(56) References Cited

U.S. PATENT DOCUMENTS

| | | | |
|---|---|---|---|
| 2009/0262891 A1 | 10/2009 | Zhang et al. | |
| 2010/0208972 A1* | 8/2010 | Bouchard | G01N 9/24 378/52 |
| 2015/0144538 A1* | 5/2015 | Lehmann | B07C 5/3427 209/589 |
| 2016/0356726 A1* | 12/2016 | Bathelet | G06K 7/1417 |
| 2019/0154596 A1* | 5/2019 | Teleki | G06T 7/12 |

FOREIGN PATENT DOCUMENTS

| | | |
|---|---|---|
| DE | 10 2014 103137 | 9/2015 |
| EP | 0 320 139 | 6/1989 |
| EP | 0 584 673 | 3/1994 |
| FR | 2 818 748 | 6/2002 |
| FR | 2 965 344 | 3/2012 |
| GB | 1 432 120 | 4/1976 |
| JP | 60-260807 | 12/1985 |
| WO | 2010/025539 | 3/2010 |
| WO | 2010/092368 | 8/2010 |
| WO | 2012/110749 | 8/2012 |

* cited by examiner

METHOD AND DEVICE FOR MEASURING DIMENSIONS BY X-RAYS, ON EMPTY GLASS CONTAINERS RUNNING IN A LINE

The present invention concerns the technical field of the inspection of empty glass containers, such as for example bottles, jars, flasks in order to detect possible dimensional defects.

The present invention concerns more specifically the measurement of dimensions on empty glass containers, running in line after their manufacture in order to determine whether such containers meet the required dimensional criteria.

After their manufacture, empty glass containers undergo various dimensional controls.

Thus, it is known that there is a risk that the containers have one or more localized areas of poor glass distribution affecting the aesthetics or more serious, the mechanical strength of the containers.

To measure the thickness of the wall of a container, a method called triangulation method is known for example from patent EP 0 320 139 or patent EP 0 584 673, consisting in projecting a light beam on the wall of the container with a non-zero angle of incidence, and collecting the light beams reflected by the outer surface and the inner surface of the wall. These light reflections on these two surfaces occur in the specular directions of the incident beams, that is to say symmetrically to the incident beam with respect to the normal to the surface at the point of impact of the incident beam. The rays reflected by the inner and outer surfaces of the wall are collected by a lens in order to be sent to a linear light sensor. The thickness of the container wall is measured according to the separation, at the light sensor, between the beams reflected by the inner and outer surfaces of the wall. The container is driven in rotation in one revolution to measure its thickness along one of its transverse cross sections.

An alternative to the previous technique of optical measurement by triangulation is the measurement by the method called "chromatism confocal optical" method as described by the application DE 10 2007 044 530. This method consists in sending a light beam having a chromatic coding, recovering the beams reflected by the inner and outer faces, on a sensor allowing to analyze the wavelength of said reflected beams, and determining the thickness depending on the wavelengths of said reflected beams.

Likewise, patent EP 2 676 127 describes a device allowing the thickness of the glass wall of the containers to be measured at several measurement points distributed on an inspection region in a superimposed manner according to a determined height of the container taken according to the central axis. The inspection method aims at detecting material distribution defects in transparent containers having a central axis and a wall delimited between an outer face and an inner face.

The optical measurements described above are widely used because they are contactless and fairly fast, but they all require the containers to be rotated to measure the thickness on a circumference. Indeed, these techniques have in common the projection of a beam of light and the recovery of the light reflected by the two inner and outer surfaces of the wall. Only some incidences and corresponding directions of observation are then possible, particularly due to the specular reflection. As the containers are generally cylindrical, the measurement is only possible for a narrow region located around the optical axis of the sensors. It is therefore not possible to use these principles for a measurement of containers running in line on a conveyor line during their manufacture.

In addition, the rotation of the containers necessary for the optical thickness measurement is expensive. Indeed, the rotation requires the use of complex handling equipment. It is indeed necessary to stop the containers arriving in translation on the conveyor, to rotate them during the measurement and to put them back in translational movement on the conveyor. The containers are then brought into contact with guides, rollers, stars. Adjustments are tedious and involve the use of equipment adapted to each container size (variable equipment). Finally, the rates are limited to 300-400 containers per minute while the current production of glass containers on the most efficient lines currently exceeds 700 containers per minute. Therefore, in some cases, double measuring equipment is required.

In a conventional manner, empty glass containers are also the subject, apart from the measurements of the thickness of their wall, of measurements at the neck or of the ring of the container (inner/outer diameters, seal, height) and of the collar of the container (inner diameter, inner profile, broaching).

In order to carry out such inspections, it is known to use one or more devices each including an inspection head intended to be lowered either over a precise distance depending on the nature of the container, or to come into contact with the container, or to rest on the container during the inspection time. In a conventional manner, such an inspection is carried out using a machine having either a linear conveyor adapted to hold the containers in precise positions, or preferably a star-shaped conveyor, with an indexed circular movement for placing the containers in relationship with different control stations. Each inspection head is displaced in an alternating vertical movement for a star-shaped conveyor while for a linear conveyor, the inspection head additionally has a horizontal displacement.

Patent FR 2 818 748 describes an inspection device including a head mounted on a horizontal slide which is fixed on a carriage displaced in vertical alternating movements by a belt mounted between an idle pulley and a pulley driven by a servomotor. One of the disadvantages of such a device is the relatively large mass displaced, which limits the speed and acceleration of displacement of the inspection head. As a result, the inspection rate of the containers is limited, which is a major disadvantage in the in line production process of the containers. Another disadvantage of such a known device appears when the inspection head is intended to come into contact with the container. Indeed, the stroke of the inspection head is not defined because of the dispersion of the height of the containers and of the defects which affect this stroke such as those which do not allow the inspection head to descend during a broaching operation. Also, given the indeterminacy of this stroke and the on-board mass, a significant shock may occur between the inspection head and the container, which is likely to cause the deterioration of the container and/or the inspection head.

Patent GB 1 432 120 describes a device for inspecting containers including several control stations, one of which aims at controlling the dimensional conformity of the rings and the collars of the containers. This control station includes a movable equipment driven by a motorization system in an alternating movement with respect to the frame of the device, in a direction of displacement parallel to the axis of symmetry of the containers. This movable equipment is equipped with an outer caliber for controlling the outside of the ring of the containers and with an inner caliber for controlling the inside of the ring and the collar of the containers. The device described by this document GB 1 432 120 has the same disadvantages as the inspection device described by patent FR 2 818 748.

The patent FR 2 965 344 makes the solution much faster by lightening the mobile part, combining a contact detection and a dynamic control of the vertical movement, but nevertheless the mechanical movements of handling the containers, the variable equipment and the contact of the calibers with the containers remain major disadvantages.

In the field of detection of a volume of liquid contained in a container, patent application WO 2010/025539 describes an X-ray inspection system and method. The principle of detection of this document is to know the thickness of liquid traversed from the radiographic image (reference 512 in FIGS. 5a and 592 in FIG. 5b) in order to deduce therefrom the filling level (meniscus 520) and therefore the total volume of liquid inside the container. To this end, the method proposes to subtract from the radiographic image, the attenuation due to the thicknesses of the traversed glass 508 and 506.

However, it is not possible in the radiography projected in the direction 502-504 to know the attenuation due to the glass and that due to the contained liquid. To overcome this problem, this document proposes to create a three-dimensional theoretical model of the container from its two-dimensional radiographic image. From the radiographic image, the attenuation of the theoretical three-dimensional model of the container is subtracted to deduce measured attenuations, only the attenuations of the liquid allowing to approximately deduce the liquid volume therefrom.

According to the exemplary embodiment described by this document, the three-dimensional theoretical model is obtained from a radiography taken in a single projection direction. The radiography is analyzed to know the two-dimensional profile of the container projected in a projection direction. The two-dimensional profile of the container is used to obtain the theoretical three-dimensional shape of the container either from a library of saved models or by revolution of the two-dimensional profile taking into account the supposed shape of axial symmetry of the containers.

According to another exemplary embodiment, this document suggests taking radiographic images in different directions to improve the precision of determining the position of the meniscus of the liquid. According to this example, the method aims at determining the position of the meniscus of the liquid in a first radiographic direction, the position of the meniscus of the liquid in a second radiographic direction and to retain the position of the meniscus of the liquid for the average position of the meniscus of the liquid.

Regardless of the exemplary embodiment, the three-dimensional theoretical model constructed according to the teaching of this document does not correspond to the real container object of the radiography. Measurements, in particular of thicknesses, performed on such a three-dimensional theoretical model are therefore false. Moreover, it should be noted that the only possible thickness measurements are those in a direction orthogonal to the direction of radiographic projection. Thus, the dimensions such as the glass thickness in the directions not orthogonal to the direction of radiographic projection are exactly the same as the thicknesses in the two-dimensional profile, therefore in the directions orthogonal to the radiographic projections. This hypothesis, which is verified only for a perfect or theoretical container as assumed in this document, is understood to be false for a container on which accurate measurements are to be performed.

Patent application JP S60 260807 proposes to measure the thickness of the walls of a tube displacing in translation along the axis of the tube, using X-ray measurements obtained from one or more foci with each of which are associated sensors. The foci and the sensors are positioned to produce radiographic projections along a plane orthogonal to the direction of displacement of the tube. The radiographic projections are therefore coplanar in a projection plane which is orthogonal to the axis of symmetry of the tube. The direction of these radiographic projections makes a right angle (90°) with respect to the direction of displacement. This technique does not allow the inner and outer surfaces of the tube to be completely known. The method described by this patent application allows measuring only the cumulative thickness of the two walls of the tube in the projection direction, without reconstruction of a three-dimensional model of a tube which would allow accurate measurements to be made in the other directions.

Likewise, U.S. Pat. No. 5,864,600 describes a method for determining the filling level of a container using an X-ray source and a sensor arranged transversely on either side of the container transport conveyor. This method allows measuring the cumulative thickness of the material. This system does not allow measurements to be made for a non-transversely oriented surface because this document does not provide for a three-dimensional modeling of the containers.

Patent application US 2009/0262891 describes a system for detecting by X-rays, objects placed in baggage displaced in translation by a conveyor. This system includes pulsed generator tubes or a sensor having a large dimension parallel to the direction of running. This document provides a method for reconstructing the object which is not satisfactory because the absence of projections in the direction of displacement does not allow the measurement of dimensions in the direction orthogonal to the direction of displacement. The lack of radiographic projections in an angular sector does not allow the creation of a suitable digital model to ensure accurate measurements.

Patent application DE 197 56 697 describes a device having the same disadvantages as patent application US 2009/0262891.

Patent application WO 2010/092368 describes a device for visualizing an object displacing in translation by X-rays using a radiation source and three linear sensors.

The patent application US 2006/0058974 describes a digital radiography imaging system allowing to acquire digital images particularly of tanks or pipelines and to transform these digital images into an absolute thickness map characterizing the object inspected. The digital data generated from each sensitive element are calibrated, for example, by correcting the variations in the X-ray paths between the X-ray source and the detector, by correcting the variations in the spatial frequency response, by correcting the variations in the geometric profile of the object under inspection and correcting the material contained in and/or around the object. This technique cannot be implemented for the dimensional control of containers running in line.

Analyzing previous technical solutions leads to concluding that there is a need for a new technique allowing dimensional measurements to be performed on containers without altering their integrity while maintaining a high conveying speed to these containers.

The present invention aims at satisfying this need by proposing a new contactless measurement technique allowing to carry out accurate dimensional measurements on containers running in line at high rate.

To achieve this purpose, the object of the invention concerns a method for measuring the dimensions of at least one region to be inspected of empty glass containers of a series each having a wall forming a neck and a body and delimited by an inner surface and an outer surface, the method consists in:

- selecting at least one region to be inspected comprising at least part of the neck and/or part of the container body;
- transporting the containers placed on their bottom in a conveying plane along a flat trajectory with a direction materialized by a displacement vector, these containers generating a conveying volume during their displacement;
- positioning, on either side of the region to be inspected, at least one focus of an X-ray generator tube and X-ray sensitive image sensors and each exposed to X-rays obtained from an associated focus, these X-rays having passed through at least the region to be inspected producing on each image sensor a radiographic projection in the projection direction;
- acquiring using image sensors for each container during its displacement, at least three radiographic images of the inspected region, obtained from at least three radiographic projections of the region to be inspected, the projection directions of which are different;
- constructing, using a computer system, a digital geometric model of the inspected region for each container, from at least three radiographic images, the digital geometric model of the region to be inspected containing the three-dimensional coordinates of a set of points, calculated from the at least three radiographic images, this set of points belonging to the inner and/or outer surface of the wall of the container, with at least two points located in a plane not orthogonal to a projection direction;
- deducing at least one inner diameter of the neck measured on the digital geometric model in a plane not orthogonal to a projection direction, and/or at least one thickness of the wall of the body measured on the digital geometric model in a plane not orthogonal to a projection direction.

In addition, the method according to the invention can further include, in combination, at least one and/or the other of the following additional characteristics:

- the digital geometric model of the region to be inspected containing the three-dimensional coordinates of a set of points consists of:
  - at least two three-dimensional points of the space each belonging to an inner and/or outer surface of the wall of the container and located in a plane not orthogonal to a projection direction, and not parallel to the displacement direction;
  - and/or at least one surface representation of the inner and outer surfaces of the wall of the container containing points not belonging to a plane orthogonal to a projection direction, and not belonging to a plane parallel to the direction of displacement;
  - and/or at least one section of the region to be inspected, along a plane different from a plane orthogonal to a projection direction and different from a plane parallel to the displacement direction;
- the method consists in selecting as region to be inspected, at least one defined area extending between two planes parallel to the conveying plane;
- the method consists in selecting as region to be inspected, an area comprising the neck and a part of the container body and in determining a digital geometric model of the region to be inspected containing the three-dimensional coordinates of a set of points belonging to the inner and outer surfaces of the container wall in the inspected region, to deduce at least one inner diameter of the neck and one thickness of the glass wall of the container body;
- the method consists in positioning on one side of the trajectory a focus from which is obtained a divergent X-ray beam of an opening >120° or at least two foci from which is obtained divergent X-ray beams the sum of the openings of which is greater than or equal to 120°;
- the method consists in arranging at least one focus in the conveying plane;
- the method consists in arranging on one side of an intersecting plane of the conveying volume, orthogonal to the conveying plane, a focus from which a divergent X-ray beam is obtained, so that its beam passes through the intersecting plane and the region to be inspected;
- the method consists in arranging on the opposite side with respect to the intersecting plane, at least one image sensor associated with said focus to receive the X-rays obtained from said focus;
- the method consists in arranging on one side of the conveying plane, a focus from which a divergent X-ray beam is obtained, so that its beam passes through the conveying plane;
- the method consists in arranging on the opposite side with respect to the conveying plane, at least one image sensor associated with said focus to receive the X-rays obtained from said focus;
- the method consists in acquiring, using image sensors, for each container during its displacement, at least two radiographic images of the inspected region corresponding to projection directions defining a useful angle greater than or equal to 45° and less than or equal to 90° and, advantageously greater than or equal to 60° and less than or equal to 90°;
- the method consists in acquiring, using image sensors, for each container during its displacement, at least one radiographic image of the inspected region corresponding to a projection direction having an opening angle with the direction of displacement comprised between 10° and 60°;
- the method consists in producing and acquiring radiographic projections of the inspected region of a container so that the X-rays obtained from the focus or foci and reaching the image sensors do not pass through other containers;
- the method consists in acquiring, using image sensors, for each container during its displacement, radiographic images obtained from between three and forty, and preferably between four and fifteen radiographic projections of the region to be inspected of different directions;
- the image sensors are of the linear type each including a linear array of X-ray sensitive elements, distributed along a support straight line defining with the associated focus, a projection plane containing the projection direction, these image sensors being arranged so that:
  - at least m sensitive elements of each of these image sensors receive the radiographic projection of the region to be inspected by the X-ray beam obtained from the associated focus;

the projection planes for the various image sensors are distinct from each other and not parallel to the conveying plane;

using each of the at least three linear image sensors, at each incremental displacement of each container along the trajectory, radiographic linear images of the region to be inspected are acquired according to a selected number so that for each container, the entire region to be inspected is completely represented in all the linear radiographic images;

the at least three sets of linear radiographic images of the region to be inspected are analyzed for each container;

the method consists in providing the computer system with an a priori geometric model of the region to be inspected of the series of containers, obtained by:
the digital model for computer design of the containers of the series;
or the digital geometric model obtained from the measurement of one or more containers of the same series by a measuring device;
or the digital geometric model generated by the computer system from entered values and/or from drawings and/or shapes selected by an operator on a man machine interface of the computer system;

the method consists in providing the computer system with the value of the attenuation coefficient of the glass constituting the containers.

Another object of the invention is to propose a facility for automatically measuring linear dimensions of at least one region to be inspected of empty glass containers each having a wall forming a neck and a body and delimited by an inner surface and an outer surface, the facility including:

a device for transporting the containers in a direction materialized by a displacement vector, along a substantially rectilinear trajectory in a conveying plane, the containers traversing a conveying volume extended in the direction;

at least one focus of an X-ray generator tube located outside the traversed volume, and creating a divergent X-ray beam directed to pass through at least one region to be inspected comprising at least part of the neck and/or part of the container body;

at least three image sensors, located outside the conveying volume, so as to receive X-rays obtained from an associated focus, the focus or foci and the image sensors being arranged so that each image sensor receives the radiographic projection of the region to be inspected by the rays obtained from the focus when the container passes through these rays, the projection directions of these radiographic projections being different from each other;

an acquisition system connected to the image sensors, so as to acquire for each container during its displacement, at least three radiographic images of the region to be inspected, obtained from at least three radiographic projections of the region to be inspected, with different projection directions;

and a computer system analyzing the at least three radiographic images, obtained from at least the three different radiographic projections, so as to build for each container, a digital geometric model of the region to be inspected, said digital geometric model containing the three-dimensional coordinates of a set of points, calculated from at least three radiographic images, this set of points belonging to the inner and/or outer surface of the wall of the container, with at least two points located in a plane not orthogonal to a projection direction, each digital geometric model allowing to deduce at least one inner diameter of the neck measured on the model in a plane not orthogonal to a projection direction, and/or at least one thickness of the wall of the body measured on the model in a plane not orthogonal to a projection direction.

In addition, the facility according to the invention may further include, in combination, at least one and/or the other of the following additional characteristics:

at least two foci for producing x-rays, positioned separately in two distinct positions and at least three image sensors, sensitive to x-rays and positioned so that:
each focus emits its beam through at least the region to be inspected to reach at least one associated image sensor;
each image sensor is associated with a focus and receives the X-rays obtained from said focus after passing through the region to be inspected;

at least one focus from which a divergent X-ray beam is obtained with an opening greater than or equal to 120° or at least two foci from which divergent X-ray beams are obtained, the sum of the openings of which is greater than or equal to 120°;

at least one focus arranged in the conveying plane;

on one side of a plane intersecting with the conveying volume and orthogonal to the conveying plane, a focus from which a beam of divergent X-rays is obtained, so that its beam passes through the intersecting plane and the region to be inspected;

on the opposite side with respect to the intersecting plane, at least one image sensor associated with said focus for receiving the X-rays obtained from said focus;

on one side of the conveying plane, a focus from which a divergent X-ray beam is obtained, so that its beam passes through the conveying plane;

on the opposite side with respect to the conveying plane, at least one image sensor associated with said focus for receiving the X-rays from said focus;

at least one focus and two image sensors are arranged so that the projection directions of the inspected region which they receive have therebetween a useful angle greater than or equal to 45° and less than or equal to 90° and, advantageously greater than or equal to 60° and less than or equal to 90°;

at least one focus and one image sensor are arranged so that, when a container passes through the field of the image sensors, the projection direction of the inspected region on the image sensor makes an opening angle with the direction of displacement comprised between 10° and 60°;

the image sensors and the foci are arranged so that the X-rays obtained from the focus or foci and reaching the image sensors and passing through the region of a container do not pass through other containers at the same time;

between one and four foci, obtained from one or more X-ray generator tubes;

the number and the arrangement of the image sensors and of the associated foci are such that for each container during its displacement, the radiographic projections of the region to be inspected on the image sensors have between three and forty, and preferably between four and fifteen different projection directions;

the image sensors are of the linear type and each include a linear array of X-ray sensitive elements, distributed along a support straight line defining with the associated focus, a projection plane containing the projection direction, these image sensors being arranged so that:

at least m sensitive elements of each of these image sensors receive the radiographic projection of the region to be inspected by the X-ray beam from the associated focus;

the projection planes for the various image sensors are distinct from each other and not parallel to the conveying plane;

at least three linear image sensors have their support straight lines parallel to each other;

at least three linear image sensors have their support straight lines orthogonal to the conveying plane;

a focus is positioned on one side of the conveying plane, and according to the invention at least one associated linear image sensor, is positioned on the side opposite the focus with respect to the conveying plane and so that its support straight line is parallel to the conveying plane;

According to the invention, the facility comprises:

a device for providing the computer system with the attenuation coefficient of the glass constituting the containers;

a device for providing the computer system with an a priori geometric model of the region to be inspected, which is a mass memory, a wired or wireless computer network or a man machine interface;

a device for providing the computer system with values and/or tolerances for the dimensions of the neck and/or with a minimum value of glass thickness for the wall of the body, and/or with at least one geometric reference model of a container.

Various other characteristics will emerge from the description made below with reference to the appended drawings which show, by way of non-limiting examples, embodiments of the object of the invention.

Figure 1:
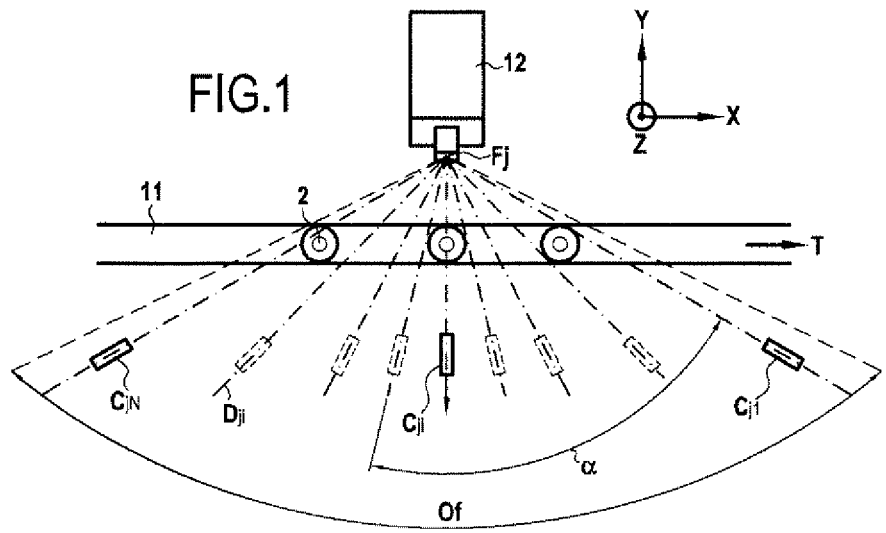
FIG. 1 is a schematic top view showing a facility allowing the measurement by X-rays, of the dimensions on containers running in line.

As a preliminary, some definitions of the terms used in the context of the invention are given below.

A focus $F_j$ of an X-ray generator tube is a point X-ray source, preferably a "micro focus", for example between 0.01 mm and 1 mm in diameter, creating a divergent X-ray beam. It is possible to use any type of point or quasi-point x-ray source.

A sensitive element is an X-ray sensitive element, in other words an elementary surface, for example 0.2×0.2 mm or 0.02×0.02 mm in dimension, converting the X-rays which it receives into an electrical signal. Generally, a scintillator converts the X-rays into visible light and then a photoelectric sensor converts visible light into an electrical signal. There are also techniques for directly converting X-rays into an electrical signal. A pixel designates an elementary value of a point in a sampled image, characterized by its gray level between 0 and a maximum value. For example, for a 12-bit digital image, a pixel takes digital values between 0 and 4095.

A system for reading or acquiring radiographic images includes one or more X-ray sensitive surfaces, that is to say surfaces comprising sensitive elements converting the X-rays into an electrical signal to be transmitted to an analysis system conventionally implemented by a computer and designated by computer system in the following description. The signals obtained from a set of sensitive elements belonging to the same sensitive surface area, acquired by the acquisition device and transmitted together to the computer system, constitute a radiographic image. In order to be analyzed by the computer system, the radiographic images are preferably converted into digital radiographic images either as close to the sensitive surface or remotely as close as possible to the computer system.

The X-ray beams obtained from a focus $F_j$ pass through at least one inspected region, and form on a sensitive surface, the radiographic projection of the inspected region, which is sometimes called the radiant image and which contains the information of attenuation of X-rays by the traversed material.

An X-ray sensitive surface area that receives the radiographic projection of the inspected region is called image sensor $C_{ji}$. An image sensor $C_{ji}$ is exposed to X-rays from an associated focus $F_j$. The image sensor converts this radiographic projection into an X-ray image of the inspected region. When the sensitive surface area contains a line of photosensitive elements, the transmitted radiographic image is linear, composed of a line of pixels forming a one-dimensional array of values. When the sensitive surface area contains a matrix of photosensitive elements, the transmitted radiographic image is a matrix radiographic image, composed of a matrix of pixels forming a two-dimensional array of values.

The projection direction $D_{ji}$ is the oriented direction or the vector leaving the focus $F_j$ and passing through the center of the image sensor $C_{ji}$, that is to say through the center of an X-ray sensitive area which receives the radiographic projection of the inspected region at the time of acquisition during the displacement of the container between the focus and the image sensor. For an image sensor-associated focus pair, the projection direction is the vector coming from the focus reaching the middle of the image sensor. The positioning of the image sensors is such that the sensitive surface is not parallel to the projection direction. It may be advantageous in some cases for the sensitive surface of the image sensor to be orthogonal to the projection direction defined with the associated focus. But this is not compulsory, for example if a sensitive surface contains several sensitive areas which cooperate for each image capture, with several different foci, therefore in different projection directions.

The projection directions Dji of radiographic projections are different if the projection directions Dji taken in pairs make therebetween a minimum angle at least equal to 5°.

A sensitive surface area containing a single line of sensitive elements constitutes a linear image sensor, which includes a linear array of sensitive elements, distributed along a support straight-line segment. According to this definition, a column or a line belonging to a matrix sensitive surface, acquired and transmitted separately by the acquisition device is considered to be a linear image sensor. Several sensitive surface areas of the same surface and each containing a single line of different pixels therefore constitute several linear image sensors. The projection direction associated with the linear radiographic image obtained is therefore the direction starting from the focus and passing through the middle of the support straight-line segment at the time of the image acquisition.

Figure 12:
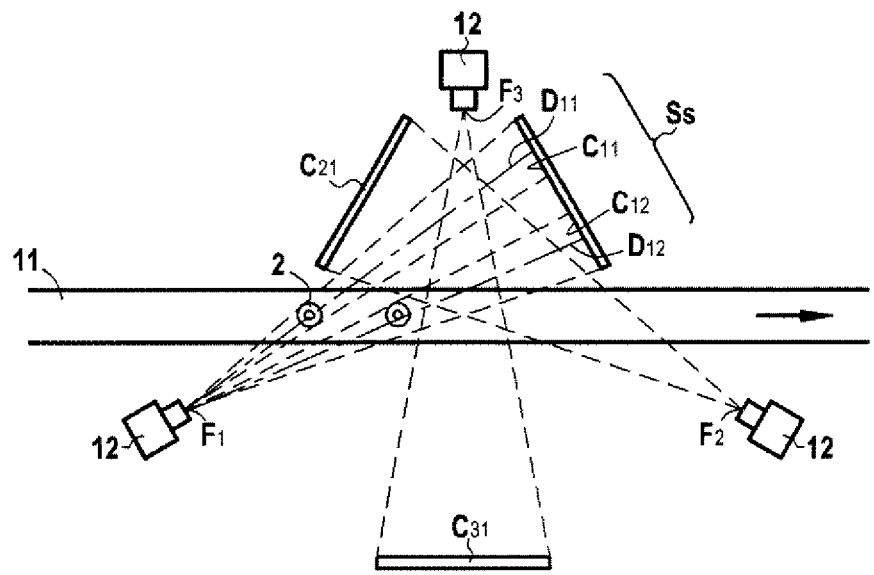
FIG. 12 is a view of an exemplary embodiment of a facility in accordance with the invention implementing matrix image sensors.
Figure 13:
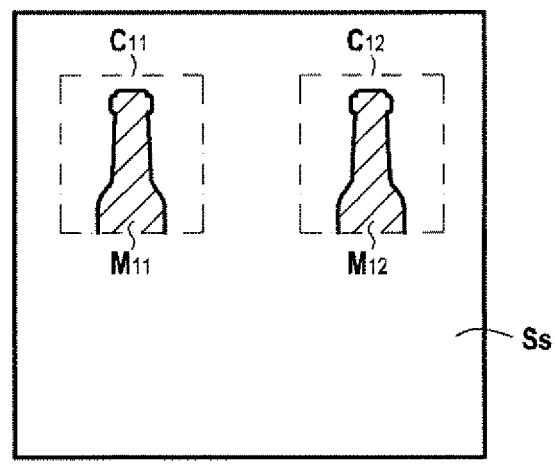
FIG. 13 is a view of a matrix of X-ray sensitive elements showing two separate areas corresponding to two matrix image sensors.

A sensitive surface area which contains a matrix of sensitive elements constitutes a matrix image sensor, which includes a matrix array of X-ray sensitive elements, distributed in a matrix. As illustrated in FIG. 12, according to this definition, a matrix sensitive surface area C11, C12, which belongs to a larger sensitive surface Ss, and which is acquired and transmitted separately by the acquisition device is a matrix image sensor. Several matrix sensitive surface areas C11, C12 of the same surface, acquired and transmitted separately by the acquisition device therefore constitute several matrix image sensors providing different radiographic images respectively M11, M12 (FIG. 13). The direction D11, D12 of projection associated with the matrix radiographic image respectively M11, M12 is the direction starting from the focus F1 and passing through the middle of the area C11, C12 of the matrix sensitive surface, at the time of acquisition of the image. It is therefore possible that the image sensors C11, C12 are non-disjoint regions activated successively over time.

Of course, the person skilled in the art can use a matrix sensor technology based on an image intensifier or else a "screen capture camera" in which a scintillator plate receives the radiant image, converts it into visible light, the image visible at the rear of the scintillator being photographed by a visible camera provided if necessary with a lens.

Figure 3:
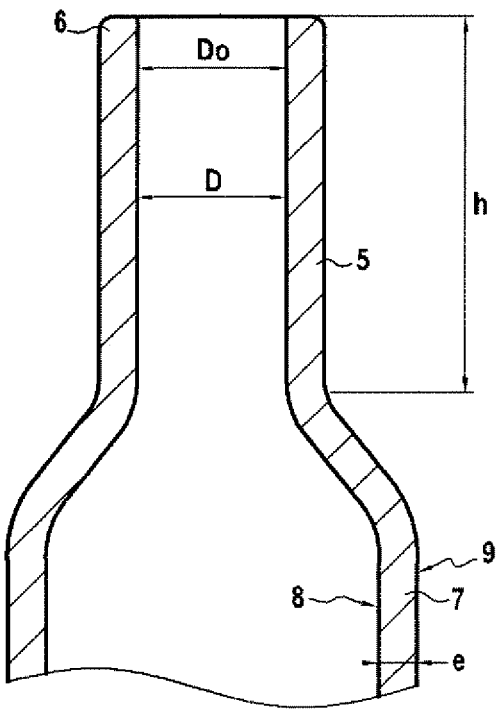
FIG. 3 is a schematic sectional view showing part of an inspected container.

As can be seen from the Figures, the object of the invention concerns a facility 1 allowing the implementation of a method for carrying out dimension measurements on empty glass containers 2. Conventionally, a container 2 is a hollow object including a bottom 3 connected to a heel or chime from which rises a body 4 extended by a shoulder connected to a neck or collar 5 terminated by a ring 6 delimiting the mouthpiece allowing the container to be filled or emptied. Thus, as illustrated in FIG. 3, a container 2 has a glass wall 7 delimited internally by an inner surface 8 and externally by an outer surface 9. The wall 7 has a thickness e between the inner surface 8 and the outer surface 9. The neck 5 has an inner diameter D defined by the inner surface of the wall.

According to an advantageous embodiment characteristic, at least one region of the container is selected to be inspected so as to be able to carry out dimension measurements in this region of the container, corresponding to a dimensional characteristic of the region to be inspected. Typically, the region to be inspected can comprise at least the neck 5 of the container and the measurement of a dimensional characteristic of this region to be inspected corresponds at least to the inner diameter D of the neck. Likewise, the region to be inspected can comprise at least one portion of the wall of the body 4 comprised between the chime and the shoulder and delimited for example by two planes parallel to the placement plane of the container, and the measurement of a dimensional characteristic of this region to be inspected corresponds to the thickness e of the glass wall comprised between the inner 8 and outer 9 surfaces delimiting this wall 7. The invention is therefore very particularly adapted for measuring dimensions in relation to the inner surface of the wall at the neck and/or the container body. Thus, the method according to the invention allows measuring at least either an inner diameter of the neck or a thickness of the glass wall or an inner diameter of the neck and a thickness of the glass wall.

Likewise, the region to be inspected may correspond to a part of the wall 7 comprising the body, the chime or the bottom of the container. The region to be inspected may also correspond to the entire container 2. The dimensions measured are glass wall thicknesses at the body, at the bottom, at the chime, heights, inner or outer diameters, widths for example for threads on the neck. These measurements also allow deducing a dimensional characteristic of the region to be inspected, such as for example the ovalization of the container or a container with a tilted neck.

The method according to the invention is implemented for glass containers 2, that is to say for series of manufactured objects composed of a single material, namely glass. It is considered that the attenuation coefficient $\mu$ of the glass is unique, that is to say having the same value at any point in a region to be inspected for the containers and preferably constant over time and identical for the containers of the series. These conditions are met because the composition of glass is stable in ovens producing several hundred tons of glass per day. It should be noted that the attenuation coefficient $\mu$ of the glass is strictly a spectral property $\mu(\lambda)$ depending on the wavelength $\lambda$ or the energy of the X-rays. This characteristic is not necessarily taken into account in the method according to the invention to the extent that the X-ray source having its specific emitted spectral composition, it is possible to consider that the attenuation $\mu$ is a characteristic of the glass for the spectrum of the selected source. The person skilled in the art will also know how to carry out the invention using any method for taking into account the spectral attenuation of the beams. He will also know how to adapt the emitted spectrum, for example by hardening it.

Consequently, the air attenuation can be considered negligible compared to that of glass. The attenuation of an X-ray beam passing through the container will depend only, on the one hand, on said constant attenuation for the emitted X-ray spectrum, and on the other hand, on the cumulative thickness of the traversed glass. Alternatively, it is considered that the thickness of the traversed air is large and uniform for all the beams, therefore it can be considered to be known. The attenuation due to air can be subtracted from the total attenuation measured. Thus the gray level in each radiographic image, optionally corrected, depends only and directly on the total cumulative glass thickness traversed. It is then possible to accurately determine the border surfaces which are the transitions between air and glass.

Thus, the computer system takes into account the attenuation coefficient of the glass of the containers being inspected for this calculation operation. Advantageously, the facility 1 includes a device for providing the computer system with the attenuation coefficient of the glass of the containers, for example known by analyzing the glass in the oven. This provisioning device can be made by a mass memory, a man machine interface or by a wired or wireless computer network.

The facility 1 also includes a device 11 for transporting the containers 2 in a conveying plane Pc, along a flat trajectory, with a direction materialized by a displacement vector T. Preferably, the trajectory is substantially rectilinear. Conventionally, the transport device 11 is a belt or chain conveyor ensuring a linear translation of the containers in the upright position, that is to say with the bottom 3 of the containers resting on the conveyor to be established in the conveying plane Pc.

The facility according to the invention allows implementing a method for automatically carrying out linear dimension measurements on containers 2 displacing in high rate running. The invention concerns a control called "in line" control of a series of containers, after a transformation or manufacturing step, in order to control the quality of the containers or of the transformation or manufacturing method.

The method operates for a running rate of a flow of containers 2. Ideally, the facility 1 is capable of processing the production at the production rate, for example of 600 containers per minute.

However, the calculation time may exceed the interval between two containers. Likewise, the exposure times of the image and reading sensors may be too long. If the fastest flow cannot be treated by a single facility in accordance with the invention, then several facilities can be implemented in parallel, each controlling part of the production. Thus it is possible to divide the production flow into two or three parallel flows inspected by two or three facilities according to the invention. Obviously, the economic interest of the invention is reached if the number of flows and therefore of facilities according to the invention remains low.

The invention brings a considerable improvement thanks to the measurement of the inner surface and the thickness of the walls, without contact and during running of the containers, the complex operations of rotating articles as implemented in carousels are eliminated. This also allows thickness mapping over the entire periphery and over the entire height of the inspected region. For the control of the neck, the invention allows measurements in the neck, for all the containers of the production, while the prior art only performs a binary conformity test by template or measurements on a few samples taken. These measurements therefore allow observation of the drifts of the manufacturing method.

Figure 2:
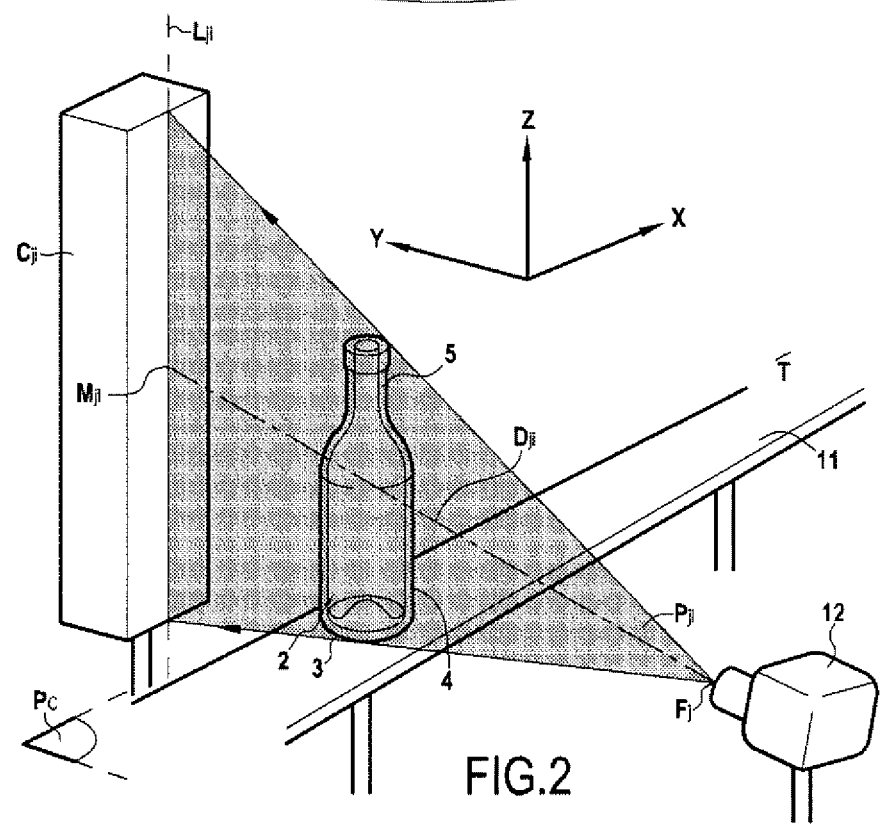
FIG. 2 is a schematic side perspective view showing a facility allowing the measurement by X-rays, of dimensions on a container.

As shown more specifically in FIGS. 1 and 2, the direction of displacement of the containers 2 is established along a horizontal axis X of a reference frame X, Y, Z including a vertical axis Z perpendicular to the horizontal axis X and a transverse axis Y perpendicular to the vertical axis Z and the horizontal axis X, and X and Y being in a plane parallel to the conveying plane Pc which is substantially horizontal.

Figure 4:
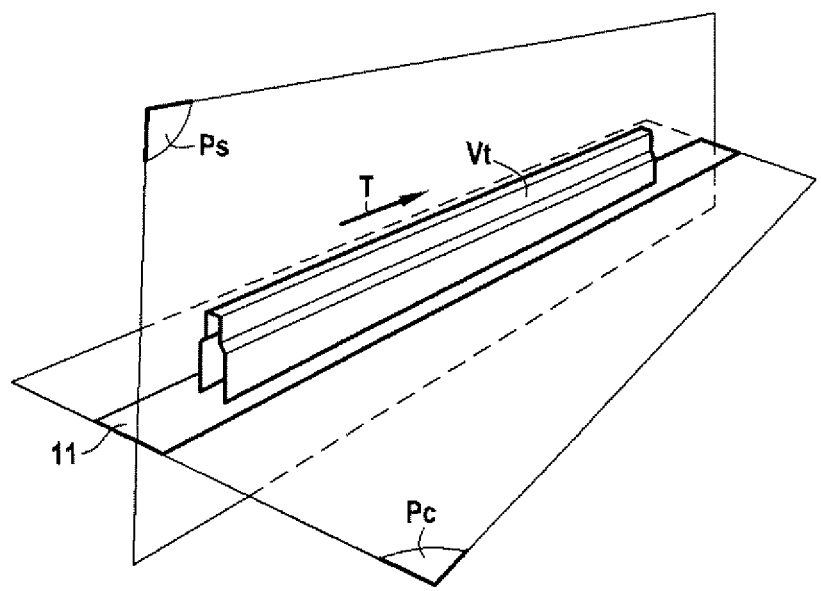
FIG. 4 is a schematic perspective view showing the volume traversed or generated by the containers during their linear displacement.

As shown more specifically in FIG. 4, during their translational displacement, the containers 2 generate or pass through a volume called conveying volume Vt. The plane Ps is the plane intersecting with the conveying volume Vt, orthogonal to the conveying plane Pc and parallel to the direction of displacement T. For example, a median plane separates the volume into two equal sub-volumes. The plane Ps is a vertical plane to the extent that the conveying plane is generally horizontal.

The facility 1 also includes, as illustrated in FIGS. 1 and 2, at least one focus Fj (with j varying from 1 to k) of an X-ray generator tube 12 creating a divergent X-ray beam directed to pass through the conveying volume Vt and more specifically to pass through at least the region to be inspected of the container 2. It should be noted that the container 2 is made of glass so that the region to be inspected of the container is made of a material whose absorption coefficient in transmission is homogeneous for a given X-ray.

The facility 1 also includes at least three image sensors Cji (with i varying from 1 to N, N greater than or equal to 3) which are sensitive to X-rays and located so as to be exposed to X-rays obtained from an associated focus Fj and having passed through the conveying volume Vt and more specifically, at least the region to be inspected from the container 2. Of course, the tube 12 and the image sensors Cji are located outside the conveying volume Vt to allow free displacement of the containers in this volume. Conventionally, the X-ray generator tubes 12 and the image sensors Cji are placed in an X-ray tight enclosure.

The X-ray beams obtained from a focus Fj associated with said image sensor Cji, pass through at least the inspected region, and form on the image sensor, the radiographic projection of the inspected region, in a projection direction Dji (FIGS. 1 and 2). The projection direction Dji is the oriented direction of the vector leaving the focus 9 and passing through the center Mji of the image sensor Cji. The focus or foci Fj and the image sensors Cji are arranged so that each image sensor receives a radiographic projection of the region to be inspected in a projection direction of the region to be inspected.

The facility 1 also includes an acquisition system connected to the image sensors Cji, so as to acquire for each container 2 during its displacement, at least three radiographic projections of the region to be inspected having different directions. It is recalled that the projection direction associated with the obtained radiographic image is the direction starting from the focus and passing through the middle of the sensitive surface area of the image sensor, at the time of acquisition of the image. Thus, the at least three radiographic projections have projection directions which make, in pairs, an angle therebetween.

The acquisition system is connected to a computer system which is not shown but of all types known per se. According to an advantageous embodiment characteristic, the computer system records using image sensors Cji, for each container during its displacement, radiographic images resulting from a determined number of radiographic projections of the region to be inspected in different projection directions. Typically, the number of different projection directions Dji is comprised between three and forty, and preferably between four and fifteen. According to an advantageous variant embodiment, the facility 1 includes between three and forty image sensors Cj. According to a preferred variant embodiment, the facility 1 includes between four and fifteen image sensors Cji.

As will be explained in detail in the following description, the computer system is programmed to analyze, for each container, the at least three radiographic images obtained from the at least three radiographic projections of different directions so as to determine, for each container, a digital geometric model of the region to be inspected containing the three-dimensional coordinates of a set of points belonging to the wall of the container in the inspected region. More specifically, each digital geometric model contains the three-dimensional coordinates of a set of points belonging at least to the inner surface of the wall of the container and preferably to the inner surface and to the outer surface of the wall of the container. The determination of the three-dimensional coordinates of these points allows carrying out dimensional measurements of the container for the inspected region, namely at least one inner diameter of the neck or at least one thickness of the glass wall of the body 4 of the container or at least one inner diameter of the neck and one thickness of the glass wall of the container body.

Determining the three-dimensional coordinates of these points and performing the dimensional measurements can be performed in any suitable manner by the known techniques of three-dimensional geometric data analysis.

Generally, the digital geometric model of the region to be inspected contains the three-dimensional coordinates of a set of points, calculated from the at least three radiographic images of the region to be inspected. This set of points belongs to the inner and/or outer surface of the wall of the container, with at least two three-dimensional points of the space located in a plane not orthogonal to a projection direction Dji.

Advantageously, the digital geometric model of the region to be inspected containing the three-dimensional coordinates of a set of points consists of:
- at least two three-dimensional points of the space each belonging to an inner and/or outer surface of the wall of the container and located in a plane not orthogonal to a projection direction Dji and not parallel to the displacement direction T;
- and/or at least one surface representation of the inner and outer surfaces of the wall of the container containing points not belonging to a plane orthogonal to a projection direction Dji, and not belonging to a plane parallel to the displacement direction T;
- and/or at least one section of the region to be inspected, along a plane different from a plane orthogonal to a projection direction Dji and different from a plane parallel to the displacement direction T.

The dimensional measurements are then carried out according to one of the methods described in the following description.

Generally, the dimensional measurements made on the digital geometric model of each container concern at least one inner diameter of the neck measured on said model in a plane not orthogonal to a projection direction Dji, and/or at least one thickness of the body wall measured on said model in a plane not orthogonal to a projection direction Dji.

A preferred exemplary embodiment consists in determining, for each container, a digital geometric model representing the inner surface and the outer surface of the container in the region to be inspected.

According to this example, the digital analysis of the radiographic images relating to each container allows constructing for each of these containers, a three-dimensional digital geometric model. In other words, for each container inspected by radiography, a three-dimensional digital geometric model is constructed from the radiographic images corresponding to said container. Optionally, this digital geometric model can simply be a stack of two-dimensional digital geometric models. Producing a digital geometric model is the way—in mathematical, graphical and data structure terms—in which three-dimensional containers are represented and manipulated in a digital form in a memory of a computer system.

The modeling can be volumetric. The mono-material container can therefore be represented by voxels whose value represents an amount of material. The voxel can be full, partially full or empty of material (in this case it is air). The volume geometric model can be analyzed to locate the borders of the container and then to measure linear dimensions such as lengths or thicknesses. It can also be transformed into a surface model, that is to say in which border surfaces of the container are modeled.

It is possible to obtain a surface model directly from radiographic images, that is to say without going through the calculation of a volume model.

In surface modelling, a container is defined by at least one three-dimensional surface. A three-dimensional surface corresponds to the border between the material of the container and the external environment (generally air), which allows understanding the interior and exterior concepts of the container. Generally three-dimensional surfaces are modeled in several ways such as by polygonal modeling, by parametric curves or surfaces (cylinders, cones, spheres, splines, . . . ) or by subdivision of surfaces. Using a mesh of polyhedra, for example triangles, the three-dimensional surfaces of the containers are represented by sets of flat facets connected by their edges.

A section of a three-dimensional container is its intersection with a plane. The section of three-dimensional surfaces are two-dimensional curves in the section plane. The knowledge of these two-dimensional curves in a succession of section planes allows the reconstruction of three-dimensional surfaces.

In order to make length measurements, there are several approaches.

In a first volume method, it is possible to run through a volume model along a straight line or a beam of straight lines and determine the matter/air border voxels.

In a second surface method, it is possible to calculate a segment whose ends are the intersections of a straight line with the material/air border surface of a surface model. The algorithms solve the topological problems fairly well. The intersection points are unique. Finally, a mixed method consists in transforming the volume model into a surface model, then applying the second method.

A third method consists in determining in a cutting plane, the distance between two points of one or two two-dimensional curves, any curve being a border between matter and air.

A three-dimensional point is a point whose coordinates are known in the three-dimensional space, in any reference frame.

These three previous methods are examples of determining a distance between two three-dimensional points, to determine a linear dimension measurement.

The purpose of the invention is to carry out more complete measurements than those made possible by simple two-dimensional radiographic images. Indeed, it is easy using a matrix image sensor to obtain a two-dimensional radiographic image corresponding to a projection of the inspected region and to measure dimensions in a plane orthogonal to the projection direction called "projected plane". Similarly, it is easy, using a linear image sensor, to obtain a two-dimensional radiographic image corresponding to a fan projection (parallel planes) of the inspected region obtained by juxtaposition of the successive image lines acquired during the displacement in the displacement direction T, and to measure dimensions in a projected plane, which is parallel to the displacement direction. On the other hand, according to the invention, linear dimensions can be measured in directions which are neither contained in the projected planes, nor parallel to the projected planes. The method according to the invention indeed consists in reconstructing and measuring dimensions in practically all directions when processing a combination of radiographic images in at least three different projection directions. This is possible by any method allowing the determination of three-dimensional points in the space belonging to a border surface included in the region to be inspected of the container. The reconstruction of a three-dimensional model of the area to be inspected, of a surface or volume type or based on section planes, is a possible method. Indeed, according to the invention, it is possible to determine, either indirectly from a surface or volume model or from section planes, or directly, at least two three-dimensional points, or even preferably three-dimensional point clouds, distributed in non-measurable directions only in two-dimensional radiographic images.

The digital geometric model is therefore composed of geometric elements such as points, segments, surfaces, elementary volumes, calculated from radiographic projections, considering to calculate each element, the attenuation of at least some X-rays having passed through this point on the real empty container, with the purpose that the digital geometric model is a faithful representation of the geometry of the real empty container, including deformations compared to an ideal empty container. In other words, the coordinates of the geometric elements are determined by considering that said coordinates have modified the radiographic projections, even when these geometric elements cannot be distinguished in any of the 2D radiographic projections. The measurements of dimensions on the digital geometric model therefore give information on the dimensions of each modeled empty container, from geometric elements which cannot be distinguished in any of the radiographic projections.

The glass container being made of a single material, therefore with a constant attenuation coefficient or considered as such, it is advantageous to determine its digital geometric model in the form of surfaces. It is possible to determine and represent in the digital geometric model for example, the inner surface of the neck of the container. The inspected region contains, according to this example, the neck 3 and therefore extends between the ring 6 surface plane and a plane which is parallel thereto. The inner diameter of the neck D can then be measured. More specifically, several inner diameters of the neck D can be measured. By selecting a given height for example by selecting a cutting plane parallel to the surface of the ring or to the bottom of the container, several diameters can be measured from 0 to 360° in this plane. Thus, it is possible to determine the diameter at the opening Do (or mouthpiece), for example at 3 mm below the mouthpiece by positioning a cutting plane 3 mm below the ring surface. It is also possible to determine a minimum diameter D over the entire height h of the inner surface of the neck to replace the measurement by broaching.

Figure 14:
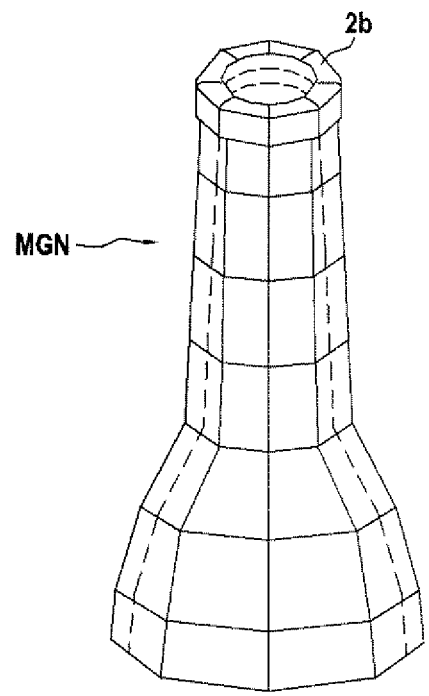
FIG. 14 is a view of a digital geometric model of a container obtained according to the method in accordance with the invention, when the inspection region comprises the neck.
Figure 15:
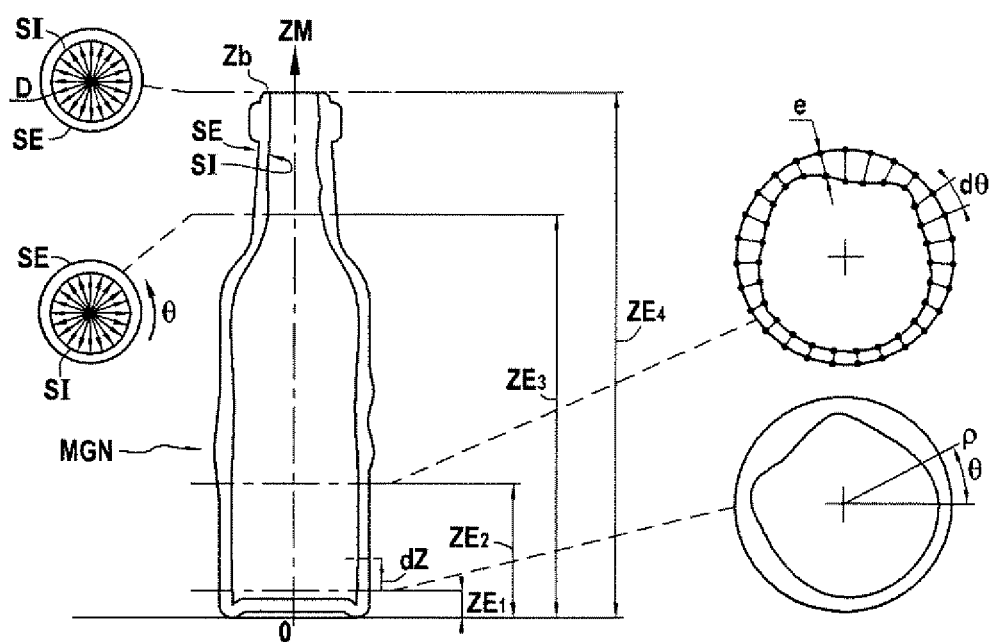
FIG. 15 shows a vertical section and four horizontal sections of the digital geometric model of a container obtained according to the method in accordance with the invention and on which measurements of dimensions are represented.

Given the geometry of the containers, it is easier to reason in cylindrical coordinates. When performing the measurements on a container, the method has produced a digital geometric model MGN representing precisely at least the region to be inspected of said container corresponding to the neck, for example as illustrated in FIG. 14 or as illustrated in FIG. 15, a vertical section or four horizontal sections of the digital geometric model MGN of the container.

A reference frame with cylindrical coordinates ZM, $\rho$, $\theta$ on this digital geometric model can be defined, with the axis ZM which corresponds to the axis of symmetry of said container model, with the height Z along the axis ZM which is equal to zero when it is located in the placement plane. It is possible in the case of a cylindrical or conical container to define ZM as an axis orthogonal to the placement plane and passing through the center of the bottom of the container. In fact, the digital geometric model MGN of a container comprises inner SI and outer SE surfaces.

According to an advantageous variant for measuring the neck of each container, the method consists in measuring on the digital geometric model MGN, as inner diameters D of the neck, the lengths of a set of straight line segments, said segments being:

orthogonal to the axis of symmetry ZM of the digital geometric model, crossing the axis of symmetry ZM of the digital geometric model, located at least at two distinct heights ZG1, ZG2 in the neck of the digital geometric model;

directions distributed angularly around the axis of symmetry ZM of the digital geometric model, with at least one segment not orthogonal to the projection directions Dij;

for each height, in a number greater than the number of projection directions Dij;

and each segment connecting two points which belong to the inner surface of the neck of the digital geometric model and which are opposite with respect to the axis of symmetry ZM of the digital geometric model of the container.

It should be noted that the segments would exactly cross the axis of symmetry ZM in the mathematical sense, only in the case of ideal containers of perfect revolution. This is obviously not the case since the digital geometric model represents a real container.

It is recalled that a main purpose of the invention is to carry out in line, that is to say when the containers are in rapid translation on a conveyor, and without the contact of a mechanical or pneumatic sensor, several measurements which are necessary, according to the types of production, to guarantee the conformity of the neck.

Broaching is the possibility of inserting into the neck a cylinder of minimum diameter, for example the filling cannula. In order to measure the broaching according to the invention, the minimum diameter can be determined over several heights along the axis of symmetry ZM and in several directions according to angles $\theta$ varying from 0 to 360°. One can also simulate the introduction of a cylinder, inside the inner surface of the digital geometric model of each container, at its neck, and determine the maximum diameter that the cylinder reaches when it is inscribed, therefore in contact without being able to further swell, inside the inner surface of the neck or of a set of points of said inner surface. To measure the opening profile of each container, it is possible from the ring surface Zb of the digital geometric model, then step by step over a depth Zb-p determined from the ring surface, to calculate at each height Z Z∈[Zb−p; Zb] a statistical data of the diameters such as for example the minimum diameter D at each depth or height Z, namely $$\min_\theta D,$$

to deduce therefrom a profile function such as the minimum diameter according to the depth namely $$\text{profile}(Z) = \min_\theta \emptyset(Z),$$

and to compare this profile to reference profiles.

To measure the diameter Do at the opening, for example at a depth of 3 mm, it can be checked that all the diameters D between the ring surface Zb until to the depth of 3 mm are contained within the tolerance range.

According to an advantageous characteristic of this variant, the method consists for the measurement of the thicknesses e of the wall of each container, in measuring a set of lengths of segments joining in pairs points of the outer surface SE and points of the inner surface SI of the digital geometric model of each container. The measured segments are:
- preferably substantially orthogonal to one of the inner and outer surfaces, preferably to the outer surface SE;
- located at least at two distinct heights ZE1, ZE2 in the region to be inspected;
- of directions adjacent to radii starting from the axis of symmetry ZM and distributed angularly around the axis of symmetry of the digital geometric model, with at least one segment not orthogonal to the projection directions Dij;
- for each height, in number greater than twice the number of projection directions Dij.

It is also possible to select as the region to be inspected, for example the body 4 of the container extending between the chime and the shoulder. Thus, the region to be inspected can be delimited by two planes parallel to the bottom 3 or to the container placement plane, one positioned above the chime the other under the shoulder. The digital geometric model of the inner and outer surfaces of the inspected region is then determined, which allows measuring the glass thickness e comprised between these surfaces at multiple points, thus providing a measurement of the distribution of the glass.

As illustrated in FIG. 15, one can at least for two separate heights ZE1, ZE2, measure the thickness e of the wall along several radial segments orthogonal to the axis ZM and distributed from 0 to 360°. The same function allowed by the optical sensors in a machine rotating the container is thus carried out at a minimum, namely, finding the minimum thickness on the circumference at one, two, three or four distinct heights.

According to the invention, the digital geometric model of the inspected region of each container comprises the inner SI and outer SE surfaces. The thickness e can therefore be determined by measuring a large number of segments joining the outer surface SE and the inner surface SI, distributed uniformly over the entire height Z and the directions θ, with a pitch of a height dZ and an angular pitch dθ as fine as allowed by the resolution of the sensors and the digital geometric model calculated for each container. Thus, the thickness in all or part of the inspection region, or even of an entire container can be mapped.

According to a variant embodiment, the method is characterized in that a minimum thickness is calculated over the region to be inspected, or else a related area of the wall having a thickness less than a tolerance threshold called "thin area" is determined and the quality of the container is decided according to the minimum thickness or the surface and/or the shape of the area of the thin area.

According to a variant embodiment, the region to be inspected corresponds to at least part of the neck 5 of the container so that the radiographic images are analyzed to construct a digital geometric model of at least the inner surface of the neck so that the inner diameter of the neck D can be measured and correspond to the measurement of a dimensional characteristic of the region to be inspected.

According to another variant embodiment, the region to be inspected corresponds to at least part of the body 4 of the container so that the radiographic images are analyzed so as to construct a digital geometric model of the inner surface and of the outer surface of the container in the inspected wall part, and from the inner and outer surfaces of the digital geometric model, to obtain the measurement of the thickness e of the glass wall of the container body comprised between said surfaces.

According to a preferred variant embodiment, the region to be inspected comprises at least part of the neck and part of the wall of the container body so that the radiographic images are analyzed so as to construct a digital geometric model of the inner surface and of the outer surface of the container, and from the inner and outer surfaces of the digital geometric model, to obtain the measurements of an inner diameter of the neck and of the thickness of the glass wall of the container body.

It appears from the above description that the invention allows constructing for each container a digital geometric model corresponding at least to the region to be inspected comprising at least part of the neck and/or part of the body of each container. As previously indicated, the digital geometric model is constructed using the attenuation coefficient of the glass constituting the containers 2.

Some of the previous measurement methods amount to analyzing the geometry of the digital geometric model of each container according to successive sections at different heights Z, of planes orthogonal to the axis of symmetry ZM of the digital geometric model of the container, therefore of the horizontal sections, which are then analyzed in radial directions, by varying the measurement direction with the angle θ between 0 and 360°. Obviously, the same results are obtained by sections along planes intersecting with the axis of symmetry ZM of the containers, therefore vertical sections, distributed at angles θ between 0 and 360°.

According to an advantageous variant embodiment, the digital geometric model is also constructed using an a priori geometric model of the inspected region allowing to accelerate and make the reconstruction calculations of the digital geometric model of each container reliable.

Thus, the a priori geometric model is a digital geometric model of the series of containers, used as initialization for a reconstruction software in order to build the digital geometric model of each inspected container. Its role is mainly to provide the computer system with information on the shape, geometry and dimensions of the object to be modeled by calculation.

Thanks to these a priori information, it becomes possible:
not to model, from radiographic images, the attenuation in regions of the empty image space of the a priori material because the attenuation is considered to be zero therein;
and/or
to model from radiographic images only the surfaces on which the measurements of dimensions are to be performed, optionally directly without going through the determination of voxels;
and/or
to determine only the deviations between the modeled surfaces from radiographic images and theoretical ideal surfaces.

Knowledge of the a priori geometric model of glass containers also allows not to determine from radiographic images, attenuation values in regions of the space containing material according to the a priori model because it is known as that of the glass used.

However, it should be understood that according to the invention, no measurement of a container is deduced from a measurement on the a priori geometric model, since this model is known independently of said container and represents a non-real theoretical ideal.

Thus the a priori geometric model is a digital model of the series of containers, used as initialization for the reconstruction software.

The computer system therefore has an a priori geometric model of the region to be inspected to perform this calculation operation. Thus, the facility 1 includes a device for providing the computer system with an a priori geometric model of the region to be inspected for the containers or series of containers.

The device for providing the computer system with an a priori geometric model of the region to be inspected is a mass memory, a wired or wireless computer network or a man machine interface.

According to a first variant of the invention, the a priori geometric model is obtained by the digital model of computer design of the containers, made during their design (3D CAD). In this case, it is provided to the computer system by various possible means, such as a connection through a computer network, to a database containing several CAD models corresponding to the various models of containers capable of being measured in production, a selection by the operator in a database internal to the facility, etc.

According to a second variant of the invention, the a priori geometric model is obtained from a digital geometric model constructed from the measurement of one or more containers of the same series (therefore of the same commercial model) by a measuring device, for example by a probe measuring machine or an axial tomography device. The a priori geometric model can be constructed by merging the measurements of several manufactured containers of the same series.

According to a third variant of the invention, the a priori geometric model is a digital geometric model generated by the computer system from entered values and/or from drawings and/or shapes selected by an operator on the man machine interface of the system.

For example, to provide the a priori geometric model in the case of a control of the inner dimensions of the neck, the inspected region contains at least the neck, therefore the region of the container comprised between the top of the ring and the shoulder of the container. The a priori geometric model of the neck can be a simple hollow truncated cone the height, both top and bottom diameters and the wall thickness of which are known. It can also be a complete geometric model, for example of a wine type ring, with its outer reliefs, counter-ring, and included roundness. According to another example, the computer system can, through its interfaces, receive technical descriptions of the a priori model, comprising for example a type of standardized screw ring described either by a saved 3D model, or by parameters of lengths, depths and thread pitch etc.

Similarly, to provide the a priori geometric model in the case of a control of the glass distribution at the container body, the inspected region extends at least over an inspection height located between the chime (or heel) and the shoulder. The a priori geometric model of the body can be a simple portion of a perfect hollow cylinder, only the outer diameter, the height and the average thickness of which are given. The means for providing the a priori digital model can therefore be limited to entering or digitally transmitting the outer diameter, height and thickness values. Of course these methods are easily generalized for containers of any shape, for example of polygonal section.

It should be understood that the a priori geometric model must at least contain enough technical, geometric, topological and/or digital information, to inform the computer system about the general three-dimensional structure of the series of containers, the degree of detail and accuracy of these information can be very low without penalizing the desired accuracy for the linear measurements.

It is possible to configure the control by providing the computer system with virtual gauge positions. In this case, the device according to the invention obviously includes means for providing measurement tolerance intervals.

Another means for determining dimensions and their conformity is to compare the digital geometric model of the inspected region with a reference or theoretical geometric model.

The geometric reference model is an ideal model from the series of the inspected containers. To carry out a dimensional control, the digital geometric model of the inspected region of each container can be compared with the geometric reference model common to the series of containers, using an algorithm comprising the matching of models, then the measurement of the deviations between the models. The geometric reference model can be obtained from the CAD at least for the outer surface of the containers.

It is thus possible to proceed with an operation of matching the digital geometric model of the inspected region of each container with the geometric reference model, then to determine dimensional deviations by measuring distances between surface elements belonging to the reference model and surface elements belonging to the digital geometric model. For example, it is possible to measure according to the invention what the glassmakers call the "diameter at the opening", which is specified by a minimum and maximum diameter tolerance, for example a tolerance interval of 18 mm+/−0.5, over a given depth from the ring surface, for example 3 mm. According to the invention, it is possible to virtually position, a first cylindrical surface of height 3 mm, of a maximum diameter inscribing in the inner modeled surface of the neck, and similarly a second cylindrical surface of height 3 mm, of a minimum diameter containing the inner surface of each modeled container, and to consider as measurements of the diameter at the opening of each container the diameters of the inscribed and described cylindrical surfaces, which are respectively compared to the tolerances.

According to a variant of the invention, the geometric reference model and the a priori geometric model are the same geometric model.

According to another variant of the invention, the a priori geometric model is less accurate, less complete and/or different from the geometric reference model.

It appears from the above description that the computer system determines for each container, at least one inner diameter of the neck and/or one thickness of the glass wall of the container body. In a general manner, the invention allows carrying out a series of dimension measurements on the containers 2. The dimensional control consists in measuring real dimensions and in comparing them with the required dimensions. A priori, any container in a series is close to the ideal reference container having the required dimensions but deviates therefrom by dimensional variations. The purpose is generally to compare the measurements obtained on the containers with the required values, for example defined by a quality department. These dimension measurements or the deviations of these measurements from the required values can be displayed, saved, etc. They can also be used to make conformity decisions on containers which can be sorted automatically. According to an advantageous embodiment characteristic, the computer system is connected to a device for displaying the values of linear measurements of the region to be inspected and/or dimensional deviations from reference values. For example, the facility according to the invention may include a screen for visualizing radiographic images of the inspected region and the measured dimensions.

According to an advantageous embodiment characteristic, the computer system is connected to a device for sorting the containers according to the linear measurement of the region to be inspected. Thus, this sorting device can eject from the transport device, the containers considered to be defective in consideration of the measured linear dimensions.

Of course, the relative positions of the foci Fj and of the image sensors Cji are diverse, it being recalled that the foci Fj and the image sensors Cji are positioned outside the conveying volume Vt.

According to a variant embodiment, the facility 1 includes a single focus Fj=F1 arranged along one side of the conveying volume Vt and a series of image sensors Cji=C1i=C11, C12, C13, . . . arranged along the opposite side of the conveying volume Vt to receive the rays coming from the focus F1 and having passed through the region to be inspected. In this example, the focus has an opening Of which is measured in at least any plane, such as for example the plane X, Y in FIG. 1, which is greater than or equal to 120°. This opening Of is considered at the outlet of the focus, in the case where the facility comprises between the focus and the volume Vt, or between the volume Vt and the image sensors, screens for limiting the beams to only useful beams, in the purpose of reducing broadcast.

According to another variant embodiment, at least two foci Fj (F1 and F2) for producing X-rays, are positioned separately in two distinct positions and at least three image sensors Cji, sensitive to X-rays, are placed so that each focus is associated with at least one image sensor Cji, and each image sensor Cji is associated with a focus and receives X-rays obtained from said focus and passing through the region to be inspected. In this example, each focus has an opening greater than or equal to 60° so that the sum of the openings of the two foci is greater than or equal to 120°.

Figure 5:
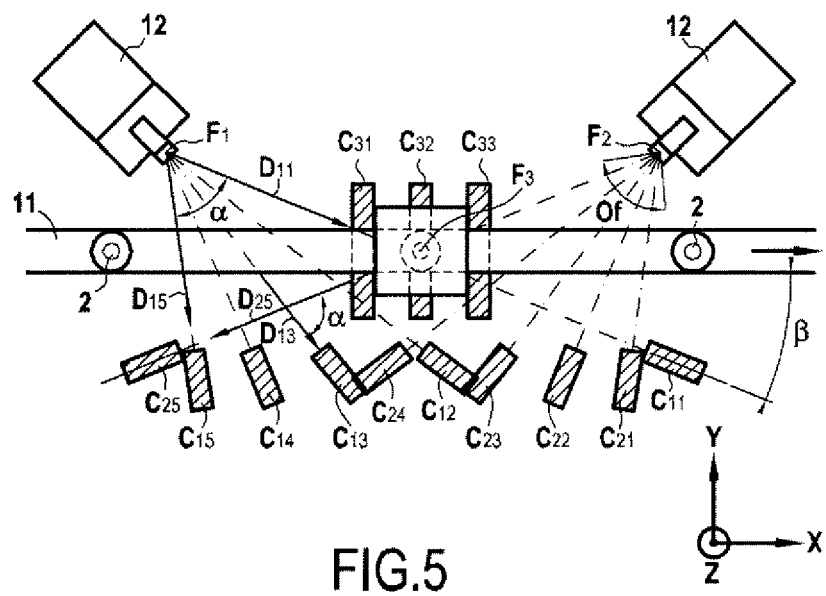
FIG. 5 is a schematic top view showing an exemplary embodiment of a facility in accordance with the invention including three x-ray generating foci.
Figure 6:
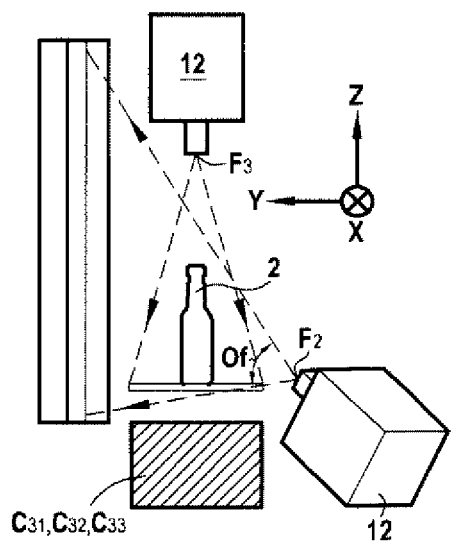
FIG. 6 is a sectional elevational schematic view of the facility illustrated in FIG. 5.
Figure 7:
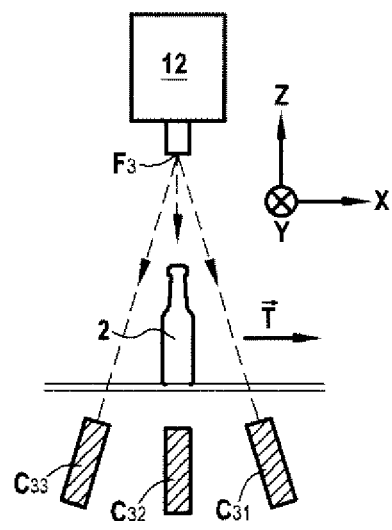
FIG. 7 is a side elevational schematic view of the facility illustrated in FIG. 5.

In the exemplary embodiment illustrated in FIGS. 5 to 7, the facility 1 includes three foci F1, F2, F3 each associated with a separate generator tube 12. The facility 1 also includes five image sensors C11, C12, C13, C14 and C15 each sensitive to X-rays obtained from the first associated focus F1, five image sensors C21, C22, C23, C24 and C25 each sensitive to X-rays from the second associated focus F2 and three image sensors C31, C32, C33 each sensitive to X-rays from the third associated focus F3.

According to this exemplary embodiment, the facility includes at least one focus (and in the example, two foci F1 and F2) from each of which a divergent X-ray beam is obtained. At least one focus (and in the example, two foci F1 and F2) are positioned on one side of the intersecting plane Ps so that each of the beams passes through the intersecting plane Ps and the region to be inspected, while at least one image sensor Cji associated with said focus Fj to receive the X-rays obtained from said focus Fj is arranged on the opposite side with respect to the intersecting plane Ps. (In the example, these are the five image sensors C11, C12, C13, C14 and C15 each sensitive to X-rays obtained from the associated focus F1 and the five image sensors C21, C22, C23, C24 and C25 each sensitive to X-rays obtained from the associated focus F2). Of course, it can be provided to have a focus on one side of the intersecting plane Ps and another focus on the other side of the intersecting plane Ps so that the associated image sensors are also arranged on either side of the intersecting plane Ps.

According to an advantageous variant embodiment which is illustrated in FIGS. 5 to 7, a focus Fj from which a diverging X-ray beam is obtained is arranged on one side of the conveying plane Pc so that its beam passes through the conveying plane Pc, while at least one image sensor Cji is associated with said focus Fj to receive the X-rays obtained from said focus is positioned on the opposite side with respect to the conveying plane Pc. In the illustrated example, a focus F3 is arranged above the conveying plane Pc while three image sensors C31, C32, C33 are positioned below the conveying plane Pc. Of course, the position between the focus and the image sensors can be reversed with respect to the conveying plane.

According to an advantageous variant embodiment, at least one of the foci Fj is arranged in the conveying plane Pc. Preferably, these foci cooperate with associated image sensors located opposite thereto with respect to the intersecting plane Ps, and thus in the case of a transport of the containers arranged on a flat conveyor, this arrangement allows, in the radiographic images, the projections of the containers not to be superimposed on the projection of the conveyor. Thus, in the digital geometric model of the containers, the part of the container in contact with the conveyor can be determined accurately.

According to an advantageous embodiment characteristic, the arrangement of the image sensors Cji and the foci is such that the X-rays obtained from the focus or foci Fj and reaching the image sensors Cji pass through only one region to be inspected at a time. In other words, X-rays only pass through one container at a time. It should be noted that the facility may include a system for controlling the spacing between the successive running containers, such as for example screws or belts in lateral contact with the containers.

An object of the invention is to obtain a method which is not only quick, but also inexpensive, capable of calculating with the accuracy required for a dimensional control. The invention aims at reducing the number of images required for the reconstruction to the minimum number allowing to achieve the desired dimensional accuracy. For example, the invention allows, with nine projections and a limited number of images of the inspected region, to measure the inner diameter of a cylinder at +/−0.05 mm. Advantageously, the facility in accordance with the invention includes between one and four foci Fj and preferably one or two foci Fj and preferably between four and fifteen image sensors Cji.

According to the invention, it is necessary to arrange the image sensors and the focus or foci so that the combination of at least three projection directions optimizes the determination of the digital geometric model of the inspected region, considering that the traversed volume Vt must be left free for the circulation of the containers. The following rules are advantageously implemented in the context of the invention, these rules being valid for linear or matrix image sensors.

Figures 8, 9:
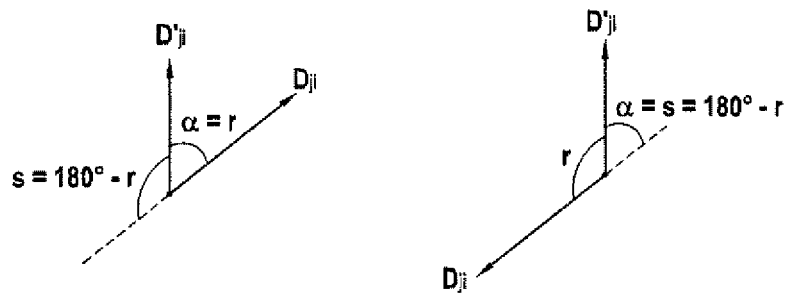
FIGS. 8 and 9 are schematic views explaining the definition of the useful angle between two projection directions.

In what follows, an angle is an absolute value. FIGS. 8 and 9 illustrate two projection directions Dji and D'ji which are also vectors. These Figures show the angle r between these two projection directions namely $r=(\overrightarrow{Dij, D'ij})$ and s the angle complementary to the angle r, namely $s=180°-r$. By definition, the useful angle $\alpha$ between two different projection directions Dji and D'ji, is the smallest of the angles r and s, namely $\alpha=Min(r, s)$. Thus, the useful angle $\alpha$ is the smallest of the angles formed by the two straight lines carrying the projection directions Dij, D'ji and brought back to any point in the inspected region.

According to an advantageous variant of the invention, at least two images obtained from two radiographic projections in two different directions Dji and D'ji forming therebetween a useful angle $\alpha$ greater than or equal to 45° and less than or equal at 90°, are acquired for each container. According to an advantageous variant embodiment, at least two images obtained from two radiographic projections in two different directions making therebetween a useful angle $\alpha$ greater than or equal to 60° and less than or equal to 90° are acquired for each container.

For this purpose, the facility 1 according to the invention includes at least one focus and two image sensors arranged so that the projection directions of the inspected region which they receive have therebetween a useful angle $\alpha$ greater than or equal to 45° and less than or equal to 90° and, advantageously greater than or equal to 60° and less than or equal to 90°.

For example, as illustrated in FIG. 5, the useful angle $\alpha$ between the directions D15 and D11, and between the directions D13 and D25 are greater than 45°. Obviously it should be understood that at least one useful angle is greater than or equal to 45° and less than or equal to 90° and advantageously that at least one useful angle is greater than or equal to 60° and less than or equal to 90° and the other useful angles between two directions Dji are arbitrary. Based on this rule, the person skilled in the art will be able to find an arrangement which provides the most complete possible distribution of the projection directions of the inspected region.

According to another advantageous characteristic, for each container, the computer system acquires at least one radiographic image of the inspected region corresponding to a projection direction making a determined opening angle $\beta$ with the displacement direction T.

Figure 10:
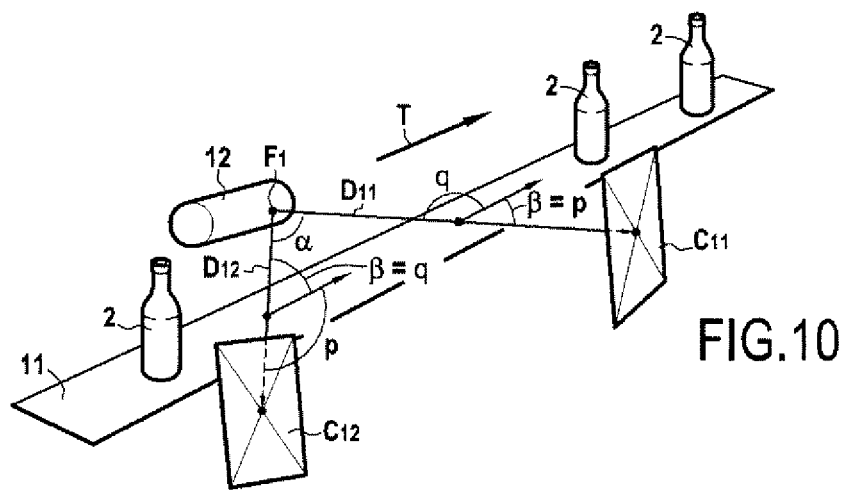
FIGS. 10 and 11 are schematic perspective views showing the positioning of image sensors with respect to the displacement of the containers to be inspected.
Figure 11:
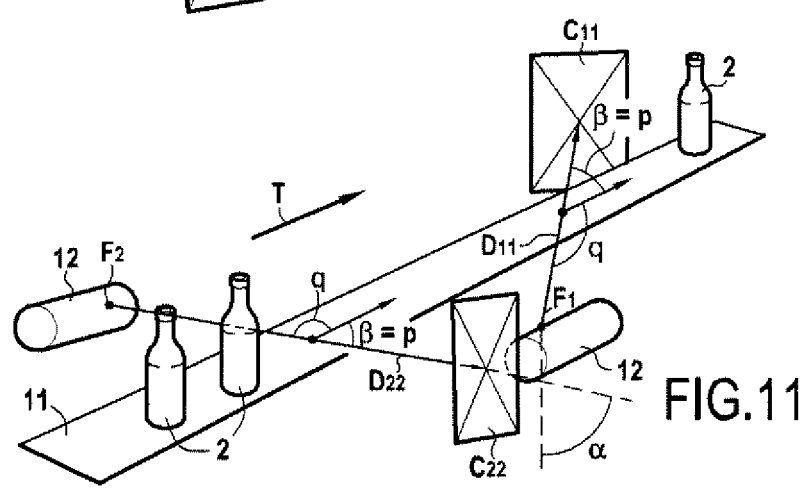

As illustrated in FIGS. 10 and 11, the angle p between a projection direction (vector Dji) and the trajectory of the containers (vector T) are considered, namely the angle $p=(Dji, T)$ that is to say $p=(D11, T)$ and $p=(D12, T)$ in the example illustrated in FIG. 10 and $p=(D22, T)$ and $p=(D11, T)$ in the example illustrated in FIG. 11. The angle q complementary to the angle p is such that $q=180°-p$. By definition, the opening angle $\beta$ between a projection direction Dji and the trajectory T is the smallest of the angles p and q, namely $\beta=Min(p, q)$. Thus, the opening angle $\beta$ is the smallest of the angles formed by the two straight lines, one carrying the projection direction Dji and the other the trajectory T, brought back to any point in the inspected region.

According to another advantageous characteristic, for each container, the computer system acquires at least one radiographic image of the inspected region corresponding to a projection direction Dji having, with the displacement direction T, an opening angle $\beta$ comprised between 10° and 60°. In other words, the facility according to the invention includes at least one focus and one image sensor Cji arranged so that, when a container passes through the field of the image sensors, the projection direction Dji of the inspected region on the image sensor Cji makes an opening angle $\beta$ with the direction of displacement T comprised between 10° and 60°.

In other words, the configuration of the facility 1 is optimized to reduce its size in the displacement direction while maintaining a traversed volume Vt adapted to the containers and a good quality of reconstruction.

Due to the traversed volume Vt, the facility does not produce a projection around the displacement direction T. The traversed volume Vt imposes a minimum beta angle. According to the invention $\beta$ min=10°. There is no sensor arranged so as to provide a projection of angle $\beta$ less than 10°.

It must be deduced from the above that the distribution of the projection angles for each container is not uniform according to the invention.

As illustrated in FIG. 9, the distribution of the projection angles has a gap, which is called a blind spot region, of twice 2×10° or 20°, instead of having complete coverage over 180°.

For example, as illustrated in FIG. 10, a facility according to the invention includes at least one focus F1 and two image sensors C11, C12, the projection directions D11, D12 of which define with the displacement direction T, an opening angle $\beta$ comprised between 10° and 60° corresponding respectively to the angles p and q. In the example illustrated in FIG. 11, the facility includes at least one image sensor C11, associated with a focus F1 and an image sensor C22 associated with a focus F2. The projection directions D11, D22 define the opening angle $\beta$ comprised between 10° and 60° and corresponding to the angles p. Likewise, the facility illustrated in FIG. 5, includes an image sensor C11 associated with the focus F1 and the projection direction D11 of which makes an angle $\beta$ comprised between 10° and 60°, with respect to the displacement direction T.

The image sensors Cji are of the matrix or linear type.

According to a preferred variant embodiment, the facility 1 includes linear image sensors. According to this preferred variant, each image sensor Cji includes a linear array of X-ray sensitive elements, distributed along a support straight line Lji defining with the associated focus Fj, a projection plane Pji containing the projection direction Dji (FIG. 2). These image sensors Cji are arranged so that at least m sensitive elements of each of these image sensors receive the radiographic projection of the region to be inspected by the X-ray beam obtained from the associated focus Fj, with the projection planes Pji for the various image sensors which are distinct from each other and not parallel to the conveying plane Pc. The number m of sensitive elements of each linear image sensor is greater than 128, preferably greater than 512. The distance between neighboring sensitive elements (called "pitch") and/or the dimension of the sensitive elements is preferably less than 800 μm. The reading frequency of the image lines is preferably greater than 100 Hz, advantageously greater than 1 kHz. Of course, these parameters are adapted depending on the size of the containers, the desired accuracy and the running speed.

According to an advantageous embodiment characteristic, at least three linear image sensors Cji have their support straight lines Lji parallel to each other.

According to another advantageous embodiment characteristic, at least three linear image sensors Cji have their support straight lines Lji orthogonal to the conveying plane Pc.

According to one variant, a focus Fj is positioned so that its beam passes through the inspected region and then the conveying plane Pc. In addition, at least one associated linear image sensor Cji is positioned opposite to the focus Fj with respect to the conveying plane Pc and in such a way that its support straight line Lji is parallel to the conveying plane Pc.

According to these variant embodiments with linear image sensors, the acquisition system acquires using each of the at least three image sensors Cji, at each incremental displacement of each container on the trajectory, radiographic linear images of the region to be inspected according to a selected number so that for each container, the entire region to be inspected is completely represented in all the linear radiographic images. Thus, during the displacement of a container, each image sensor is capable of acquiring linear radiographic images so that the entire region to be inspected of the container is completely represented in all the linear radiographic images obtained from said image sensor. Thus, for each container, at least three sets of linear radiographic images of the region to be inspected are obtained, which are then analyzed. Matrix radiographic images of the inspected region can be created by juxtaposing sets of linear radiographic images. But the reconstruction of the geometric model and the measurement do not necessarily impose it.

It should be noted that taking into account the traversed volume Vt, no radiographic projection is acquired in the blind spot region ($\beta < \pm 10°$) located on either side of the displacement direction T. The method according to the invention allows, despite the absence of radiographic projections in this angle interval, reconstructing, thanks to the a priori geometric model, an accurate and complete digital geometric model of the container. It is thus possible to perform measurements of linear dimension over the entire digital geometric model and in particular along directions which are not orthogonal to the possible projection directions, including linear dimension measurements in measurement directions orthogonal to the directions of the missing projections corresponding to the blind spot region located on either side of the displacement direction T. Indeed, without the method according to the invention, for example with the methods intended for the conventional "complete" axial tomography, in the case where no radiographic projection is acquired in the directions of a blind spot, then the reconstructed model also has in an angular sector orthogonal to the blind spot, reconstruction errors making it impossible to accurately determine a surface and therefore making any measurement of a linear dimension of a container impossible.

The incremental displacement is the translation performed by the container between two successive acquisitions of images. For a given running speed of the containers, the incremental displacement is inferiorly limited by the reading speed of the image sensors. This parameter, combined with the vertical resolution of the linear image sensors, (or with the horizontal and vertical resolutions of the matrix image sensors), conditions the density of the measured points of the digital geometric model, therefore ultimately the spatial resolution and the accuracy of the measurement of the dimensional characteristic of the region to be inspected. For example, the incremental displacement may be less than 0.5 mm, preferably less than 0.2 mm, which means that the image sensors are read 5 times during a displacement of 1 mm of the containers.

Of course, the number of foci, the number of image sensors associated with each focus, and their relative arrangements are selected in any suitable manner according to the desired degree of measurement accuracy, the shape of the containers and their spacing over the conveyor.

The invention allows the measurement of dimensions (for a dimensional control) on glass containers running at high speed and without contact, by at least three X-ray projections of different directions, and by means of an optimal, rapid and sufficiently accurate calculation, thanks to the mono-material property and by the a priori knowledge of the general shape of the containers.

It should be noted that in glassware, it is possible that several series of different containers are present at the same time on the same control line. The facility according to the invention can be used to inspect a flow of containers composed of several different series, for example a first series and a second series. In this case, the facility includes a system for indicating to the computer system the series to which each of the containers belongs in order to implement the method of the invention to all the containers of the same series. In other words, the facility is provided with a means for providing the computer system with an a priori geometric model of each container series, and the computer system is adapted in order to associate the radiographic images of each container with the series to which it belongs.

The invention is not limited to the examples described and shown since various modifications can be made without departing from the scope thereof.

The invention claimed is:

1. A method for measuring dimensions of at least one region to be inspected of empty glass containers of a series (2) each having a wall forming a neck and a body and delimited by an inner surface and an outer surface, the method comprising:
   selecting at least one region to be inspected comprising at least part of the neck and/or part of the container body;
   transporting the containers placed on their bottom in a conveying plane (Pc) along a flat trajectory with a direction materialized by a displacement vector (T), these containers generating a conveying volume (Vt) during their displacement;
   positioning, on either side of the region to be inspected, at least one focus (Fj) of an X-ray generator tube and X-ray sensitive image sensors (Cji) and each exposed to X-rays obtained from an associated focus (Fj), these X-rays having passed through at least the region to be inspected producing on each image sensor a radiographic projection in the projection direction (Dji);
   acquiring using Image sensors (Cji) for each container during its displacement, at least three radiographic images of the inspected region, obtained from at least three radiographic projections of the region to be inspected, the projection directions of which are different;
   constructing, using a computer system, a digital geometric model of the region to be inspected for each container, from at least three radiographic Images, said geometric model containing the three-dimensional coordinates of a set of points, calculated from the at least three radiographic images, this set of points belonging to the inner and/or outer surface of the wall of the container, with at least two points located in a plane not orthogonal to a projection direction (Dji), deducing at least one inner diameter of the neck measured on the model in a plane not orthogonal to a projection direction (Dji), and/or at least one thickness of the wall of the body measured on the model in a plane not orthogonal to a projection direction (Dji).

2. The method according to claim 1, characterized in that the digital geometric model of the region to be Inspected containing the three-dimensional coordinates of a set of points comprises:

at least two three-dimensional points of the space each belonging to an inner and/or outer surface of the wall of the container and located in a plane not orthogonal to a projection direction (Dji), and not parallel to the displacement direction (T);

and/or at least one surface representation of the inner and outer surfaces of the wall of the container containing points not belonging to a plane orthogonal to a projection direction (Dji), and not belonging to a plane parallel to the displacement direction (T);

and/or at least one section of the region to be inspected, along a plane different from a plane orthogonal to a projection direction (Dji) and different from a plane parallel to the displacement direction (T).

3. The method according to claim 1, further comprising selecting as region to be Inspected, at least one defined area extending between two planes parallel to the conveying plane (Pc).

4. The method according to claim 1, further comprising measuring the neck of each container, in measuring as the inner diameters of the neck, the lengths of a set of straight line segments, said segments being:

orthogonal to the axis of symmetry of the digital geometric model;

crossing the axis of symmetry of the digital geometric model;

located at least at two distinct heights (ZG1, ZG2) in the neck of the digital geometric model;

directions distributed angularly around the axis of symmetry of the digital geometric model, with at least one segment not orthogonal to the projection directions (Dji);

for each height, in a number greater than the number of projection directions (Dji);

and each segment connecting two points which belong to the inner surface of the neck of the digital geometric model and which are opposite with respect to the axis of symmetry of the digital geometric model of the container.

5. The method according to claim 4, characterized in that the minimum diameter is calculated over several heights and several directions of the neck of the digital geometric model, so as to determine the measurement of broaching or diameter at the opening.

6. The method according to claim 1, wherein for the measurement of the thicknesses of the wall of each container, in measuring a set of lengths of segments joining in pairs points of the outer surface and points of the inner surface of the digital geometric model of each container, the measured segments being:

substantially orthogonal to one of the inner and outer surfaces, preferably to the outer surface;

located at least at 2 distinct heights (HE1, HE2) In the region to be inspected;

of directions adjacent to radii starting from the axis of symmetry and distributed angularly around the axis of symmetry of the digital geometric model of the container, with at least one segment not orthogonal to the projection directions (Dij);

for each height, in number greater than twice the number of projection directions (Dij).

7. The method according to claim 1, characterized in that a minimum thickness is calculated over the region to be inspected, or else a related area of the wall having a thickness less than a tolerance threshold called thin area is determined and the quality of the container is decided according to the minimum thickness or the surface and/or the shape of the area of the thin area.

8. The method according to claim 1, characterized in that a focus from which is obtained a divergent X-ray beam of an opening >120° or at least two foci from which is obtained divergent X-ray beams the sum of the openings of which is greater than or equal to 120°, is/are positioned on one side of the trajectory.

9. The method according to claim 1, further comprising arranging at least one focus in the conveying plane (Pc).

10. The method according to claim 1, further comprising:

arranging on one side a plane (Ps) Intersecting with the conveying volume (Vt), orthogonal to the conveying plane (Pc), a focus (Fj) from which a beam of divergent X-rays is obtained, so that its beam passes through the intersecting plane (Ps) and the region to be inspected;

arranging on the opposite side with respect to the intersecting plane (Ps), at least one image sensor (Cji) associated with said focus (Fj) to receive the X-rays obtained from said focus (Fj).

11. The method according to claim 1, further comprising:

arranging on one side of the conveying plane (Pc), a focus (Fj) from which a divergent X-ray beam is obtained, so that its beam passes through the conveying plane (Pc);

arranging on the opposite side with respect to the conveying plane (Pc), at least one image sensor (Cji) associated with said focus (Fj) to receive the X-rays obtained from said focus (Fj).

12. The method according to claim 1, further comprising acquiring, using image sensors (Cji), for each container during its displacement, at least two radiographic images of the inspected region corresponding to projection directions (Dji) defining a useful angle ($\alpha$) greater than or equal to 45° and less than or equal to 90°.

13. The method according to claim 1, further comprising acquiring, using image sensors (Cji), for each container during its displacement, at least one radiographic image of the inspected region corresponding to a projection direction (Dji) having an opening angle ($\beta$) with the direction of displacement (T) comprised between 10° and 60°.

14. The method according to claim 1, further comprising acquiring, using image sensors (Cji), for each container of the series during its displacement, no radiographic image of the inspected region corresponding to a projection direction (Dji) having an opening angle ($\beta$) with the direction of displacement (T) less than 10°.

15. The method according to claim 1, further comprising producing and acquiring radiographic projections of the inspected region of a container so that the X-rays obtained from the focus or foci and reaching the image sensors (Cji) do not pass through other containers.

16. The method according to claim 1, further comprising acquiring, using image sensors (Cji), for each container during its displacement, radiographic images obtained from between three and forty radiographic projections of the region to be inspected of different directions.

17. The method according to claim 1, further comprising acquiring, using image sensors (Cji), for each container during its displacement, radiographic images obtained from between four and fifteen radiographic projections of the region to be inspected of different directions.

18. The method according to claim 1, characterized in that:
the image sensors (Cji) are of the linear type each including a linear array of X-ray sensitive elements, distributed along a support straight line (Lji) defining with the associated focus (Fj), a projection plane (Pji) containing the projection direction (Dji), these image sensors being arranged so that:
at least m sensitive elements of each of these image sensors receive the radiographic projection of the region to be Inspected by the X-ray beam from the associated focus (Fj);
the projection planes (Pji) for the various image sensors are distinct from each other and not parallel to the conveying plane (Pc);
using each of the at least three linear image sensors (Cji), at each incremental displacement of each container along the trajectory (T), radiographic linear images of the region to be inspected are acquired according to a selected number so that for each container, the entire region to be Inspected is completely represented in all the linear radiographic images;
the at least three sets of linear radiographic images of the region to be Inspected are analyzed for each container.

19. The method according to claim 1, further comprising providing the computer system with an a priori geometric model of the region to be inspected of the series of containers, obtained by:
the digital model for computer design of the containers of the series;
or the digital geometric model obtained from the measurement of one or more containers of the same series by a measuring device;
or the digital geometric model generated by the computer system from entered values and/or from drawings and/or shapes selected by an operator on a man machine interface of the computer system.

20. The method according to claim 1, further comprising providing the computer system with the value of the attenuation coefficient of the glass constituting the containers.

21. A facility for automatically measuring linear dimensions of at least one region to be inspected of empty glass containers (2) each having a wall forming a neck and a body and delimited by an inner surface and an outer surface, the facility comprising:
a device (11) for transporting the containers in a direction materialized by a displacement vector (T), along a substantially rectilinear trajectory in a conveying plane (Pc), the containers traversing a conveying volume (Vt) extended in the direction (T);
at least one focus (Fj) of an X-ray generator tube (12) located outside the traversed volume (Vt), and creating a divergent X-ray beam directed to pass through at least one region to be inspected comprising at least part of the neck and/or part of the container body;
at least three image sensors (Cji), located outside the conveying volume (Vt), so as to receive X-rays obtained from an associated focus (Fj), the focus or foci (Fj) and the image sensors (Cji) being arranged so that each image sensor receives the radiographic projection of the region to be inspected by the rays obtained from the focus (Fj) when the container passes through these rays, the projection directions of these radiographic projections being different from each other;
an acquisition system connected to the image sensors (Cji), so as to acquire for each container during its displacement, at least three radiographic Images of the region to be Inspected, obtained from at least three radiographic projections of the region to be inspected, with different projection directions;
and a computer system analyzing the at least three radiographic images, obtained from at least the three different radiographic projections, so as to build for each container, a digital geometric model of the region to be Inspected, said digital geometric model containing the three-dimensional coordinates of a set of points, calculated from at least three radiographic Images, this set of points belonging to the inner and/or outer surface of the wall of the container, with at least two points located in a plane not orthogonal to a projection direction (Dji), each digital geometric model allowing to deduce at least one inner diameter of the neck measured on the model in a plane not orthogonal to a projection direction (Dji), and/or at least one thickness of the wall of the body measured on the model in a plane not orthogonal to a projection direction (Dji).

22. The facility according to claim 21, further comprising at least two foci (F1, F2) for producing X-rays, positioned separately in two distinct positions and at least three image sensors (Cji), sensitive to X-rays and positioned so that:
each focus emits its beam through at least the region to be Inspected to reach at least one associated image sensor (Cji);
each image sensor (Cji) is associated with a focus and receives the X-rays obtained from said focus after passing through the region to be inspected.

23. The facility according to claim 21, further comprising at least one focus from which a divergent X-ray beam is obtained with an opening greater than or equal to 120° or at least two foci from which divergent X-ray beams are obtained the sum of the openings of which is greater than or equal to 120°.

24. The facility according to claim 21, further comprising at least one focus arranged in the conveying plane (Pc).

25. The facility according to claim 21, further comprising:
on one side of a plane (Ps) intersecting with the conveying volume and orthogonal to the conveying plane (Pc), a focus (Fj) from which a beam of divergent X-rays is obtained, so that its beam passes through the intersecting plane (Ps) and the region to be inspected;
on the opposite side with respect to the Intersecting plane (Ps), at least one image sensor (Cji) associated with said focus (Fj) to receive the X-rays obtained from said focus (Fj).

26. The facility according to claim 21, further comprising:
on one side of the conveying plane (Pc), a focus (Fj) from which a divergent X-ray beam is obtained, so that its beam passes through the conveying plane (Pc);
on the opposite side with respect to the conveying plane (Pc), at least one image sensor (Cji) associated with said focus (Fj) to receive the X-rays obtained from said focus (Fj).

27. The facility according to claim 21, characterized in that at least one focus and two image sensors (Cji) are arranged so that the projection directions (Dji) of the inspected region which they receive have therebetween a useful angle (α) greater than or equal to 45° and less than or equal to 90°.

28. The facility according to claim 21, characterized in that at least one focus (Fj) and an image sensor (Cji) are arranged so that when a container (2) passes through the field of the image sensors, the projection direction (Dji) of the inspected region on the image sensor (Cji) makes an opening angle (β) with the direction of displacement (T) comprised between 10° and 60°.

29. The facility according to claim 21, characterized in that the image sensors (Cji) and the foci (FJ) are arranged so that the X-rays obtained from the focus or foci and reaching the image sensors (Cji) and passing through the region of a container do not pass through other containers at the same time.

30. The facility according to claim 21, further comprising between one and four foci (Fj), obtained from one or more X-ray generator tubes.

31. The facility according to claim 21, characterized in that the number and the arrangement of the image sensors (Cji) and associated foci, are such that for each container (2) during its displacement, the radiographic projections of the region to be inspected on the image sensors have between three and forty, different projection directions.

32. The facility according to claim 21, characterized in that the number and the arrangement of the image sensors (Cji) and associated foci, are such that for each container (2) during its displacement, the radiographic projections of the region to be inspected on the image sensors have between four and fifteen different projection directions.

33. The facility according to claim 21, characterized in that:
   the image sensors (Cji) are of the linear type and each Include a linear array of X-ray sensitive elements, distributed along a support straight line (Lji) defining with the associated focus (Fj), a projection plane (Pji) containing the projection direction (Dji), these image sensors being arranged so that:
   at least m sensitive elements of each of these image sensors receive the radiographic projection of the region to be inspected by the X-ray beam obtained from the associated focus (Fj);
   the projection planes (Pji) for the various image sensors are distinct from each other and not parallel to the conveying plane (Pc).

34. The facility according to claim 33, characterized in that at least three linear image sensors (Cji) have their support straight lines (Lji) parallel to each other.

35. The facility according to claim 33, characterized in that at least three linear image sensors (Cji) have their support straight lines (Lji) orthogonal to the conveying plane (Pc).

36. The facility according to claim 33, characterized in that a focus (Fj) is positioned on one side of the conveying plane (Pc), and in that at least one associated linear image sensor (Cji), is positioned on the side opposite the focus (Fj) with respect to the conveying plane (Pc) and so that its support straight line (Lji) is parallel to the conveying plane (Pc).

37. The facility according to claim 21, further comprising a device for providing the computer system with the attenuation coefficient of the glass constituting the containers.

38. The facility according to claim 21, further comprising a device for providing the computer system with an a priori geometric model of the region to be Inspected, which is a mass memory, a wired or wireless computer network or a man machine interface.

39. The facility according to claim 21, further comprising a device for providing the computer system with values and/or tolerances for the dimensions of the neck and/or with a minimum value of glass thickness for the wall of the body, and/or with at least one geometric reference model of a container.

* * * * *